US011813487B2

(12) United States Patent
Stephenson et al.

(10) Patent No.: US 11,813,487 B2
(45) Date of Patent: Nov. 14, 2023

(54) FALL ARRESTING DEVICE CONNECTOR

(71) Applicant: 3M INNOVATIVE PROPERTIES COMPANY, St. Paul, MN (US)

(72) Inventors: Matthew S. Stephenson, Red Wing, MN (US); Rick G. Miller, Red Wing, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 673 days.

(21) Appl. No.: 16/629,230

(22) PCT Filed: Jul. 12, 2018

(86) PCT No.: PCT/IB2018/055149
§ 371 (c)(1),
(2) Date: Jan. 7, 2020

(87) PCT Pub. No.: WO2019/012468
PCT Pub. Date: Jan. 17, 2019

(65) Prior Publication Data
US 2020/0129790 A1 Apr. 30, 2020

Related U.S. Application Data

(60) Provisional application No. 62/532,005, filed on Jul. 13, 2017.

(51) Int. Cl.
*A62B 35/00* (2006.01)
*F16B 21/12* (2006.01)
(Continued)

(52) U.S. Cl.
CPC ...... *A62B 35/0037* (2013.01); *A62B 35/0025* (2013.01); *A62B 35/0068* (2013.01);
(Continued)

(58) Field of Classification Search
CPC ............ A62B 35/0037; A62B 35/0075; A62B 35/0025; A62B 35/0068; A62B 35/00;
(Continued)

(56) References Cited

U.S. PATENT DOCUMENTS 8,276,712 B2   10/2012 Smith
8,938,864 B2   1/2015 Casebolt
(Continued)

FOREIGN PATENT DOCUMENTS

CA    2012941    10/1990
CA    2846390    5/2013
(Continued)

OTHER PUBLICATIONS

Search Report for TW Appl. No. 107124165, dated Jul. 22, 2021, 1 pg.

(Continued)

*Primary Examiner* — Taylor Morris
(74) *Attorney, Agent, or Firm* — Steven A. Bern; Johannes P. M. Kusters

(57) ABSTRACT

Connectors for coupling fall arresting devices to a safety harness. The connectors may include a first pin configured to lock into a first side of a base portion using one or more locking mechanisms. The first pin may be used to engage with one or more fall arresting devices to attach the one or more fall arresting devices to the connector. In some such examples, the locking mechanisms may be positioned within interior portions of the first side of the connector so as to allow the one or more fall arresting devices to pivot freely about the ends of the connector. In some examples, the connectors may include a second pin configured to lock into a second side of the base portion using one or more locking (Continued)

mechanisms. The second pin may be used to conveniently and releasably attached the connector to a safety harness of a worker.

17 Claims, 12 Drawing Sheets

(51) Int. Cl.
*F16B 21/14* (2006.01)
*F16B 45/04* (2006.01)
(52) U.S. Cl.
CPC .............. *F16B 21/12* (2013.01); *F16B 21/14* (2021.08); *F16B 45/04* (2013.01)
(58) Field of Classification Search
CPC ...... A62B 35/0006; F16B 21/14; F16B 45/04; F16B 21/12
USPC .......................................................... 182/3
See application file for complete search history.

(56) References Cited

U.S. PATENT DOCUMENTS

| | | | |
|---|---|---|---|
| 9,174,073 B2* | 11/2015 | Casebolt | F16C 11/04 |
| 9,243,742 B2 | 1/2016 | Grumberg et al. | |
| 9,273,717 B2* | 3/2016 | Schlangen | A62B 35/0037 |
| 9,295,305 B2* | 3/2016 | Patel | A62B 35/0031 |
| 9,427,608 B2 | 8/2016 | Fink | |
| 9,435,484 B1 | 9/2016 | Yang et al. | |
| 9,585,439 B2 | 3/2017 | Casebolt | |
| 10,016,638 B2 | 7/2018 | Casebolt et al. | |
| 10,143,866 B2 | 12/2018 | Yang | |
| 11,077,326 B2* | 8/2021 | Roger | F16B 45/04 |
| 2002/0124362 A1 | 9/2002 | Glasa | |
| 2002/0136600 A1 | 9/2002 | Thompson et al. | |
| 2003/0159883 A1 | 8/2003 | Carson | |
| 2007/0199767 A1 | 8/2007 | Altieri | |
| 2011/0186382 A1 | 8/2011 | Sudale et al. | |
| 2011/0214938 A1 | 9/2011 | McLaughlin | |
| 2013/0104351 A1 | 5/2013 | Casebolt | |
| 2013/0104374 A1 | 5/2013 | Schlangen | |
| 2014/0224580 A1 | 8/2014 | Casebolt | |
| 2016/0361577 A1* | 12/2016 | Perner | A62B 35/0031 |
| 2017/0291046 A1* | 10/2017 | Bouquier | A62B 35/0025 |
| 2017/0319880 A1* | 11/2017 | Yang | A62B 35/0068 |
| 2018/0345053 A1* | 12/2018 | Bouquier | A62B 35/0037 |
| 2018/0345054 A1* | 12/2018 | Yang | A62B 35/0068 |
| 2019/0069644 A1* | 3/2019 | Hetrich | A44B 13/00 |
| 2019/0070443 A1* | 3/2019 | Hetrich | A62B 35/0037 |
| 2019/0329077 A1* | 10/2019 | Carrasca | A62B 35/0037 |
| 2020/0230445 A1* | 7/2020 | Auston | A62B 35/0037 |
| 2020/0406072 A1* | 12/2020 | Monahan | A44B 11/2546 |
| 2021/0353982 A1* | 11/2021 | Hung | A62B 35/0043 |

FOREIGN PATENT DOCUMENTS

| | | | | |
|---|---|---|---|---|
| CN | 2421447 | Y | 2/2001 | |
| CN | 201969223 | U | 9/2011 | |
| DE | 202015102474 | | 7/2015 | |
| DE | 202016105244 | U1 * | 11/2016 | ......... A62B 35/0025 |
| DE | 102020122454 | B3 * | 9/2021 | ......... A62B 35/0037 |
| EP | 3162411 | A1 * | 5/2017 | ......... A62B 35/0006 |
| EP | 3228362 | A1 * | 10/2017 | ............. A44B 11/25 |
| EP | 3228363 | A1 * | 10/2017 | ............. A62B 35/00 |
| EP | 3466493 | A1 * | 4/2019 | ......... A62B 35/0006 |
| JP | 2003254393 | A | 9/2003 | |
| TW | M474533 | | 3/2014 | |
| TW | M506176 | | 8/2015 | |
| WO | WO-2005025677 | A1 * | 3/2005 | ......... A62B 35/0031 |
| WO | WO-2013063384 | A2 * | 5/2013 | ............. A44B 11/04 |
| WO | WO-2019051065 | A1 * | 3/2019 | ............. A44B 11/28 |
| WO | WO-2020148655 | A1 * | 7/2020 | ......... A62B 35/0018 |
| WO | WO-2020264238 | A1 * | 12/2020 | ........... A44B 11/006 |

OTHER PUBLICATIONS

International Search Report for PCT International Application No. PCT/IB2018/055149, dated Oct. 29, 2018, 4 pages.

Search Report for BR Appl. No. BR112020000627-0, dated Jul. 19, 2022, 2 pp.

* cited by examiner

FALL ARRESTING DEVICE CONNECTOR

TECHNICAL FIELD

This disclosure relates to safety equipment and, in particular, fall protection systems and devices.

BACKGROUND

Fall protection systems and devices are important safety equipment for workers operating at potentially harmful or even deadly heights. For example, to help ensure safety in the event of a fall, workers often wear safety harnesses connected to support structures with fall protection equipment such as lanyards, energy absorbers, self-retracting lifelines (SRLs), descenders, and the like. When a worker is connected to a support structure, the worker may be referred to as being "tied off." In order to maintain a safe working condition when working at height, a worker may maintain at least one point of connection to a support structure at all times. Often a worker may use two points of connection to the support structure to provide redundant safety and ensure that at least one of the points of connection remains connected to the support structure at all times.

Fall protection systems may include a variety of components for connecting a worker to a support structure (also referred to as an anchorage). For example, snap hooks, carabiners, and quick-links may have moveable gates that allow a worker to connect the safety harness of the worker to the support structure and other fall arresting devices.

SUMMARY

In general, this disclosure describes connectors for use with fall protection systems that are designed to arrest the fall of a worker when working at dangerous heights. The connectors may be used to link one or more fall arresting devices to a safety harness of a user. In some examples, the connectors described herein may include a first pin configured to lock into a first side of a base portion using one or more locking mechanisms. The first pin may be used to engage with one or more fall arresting devices to attach the one or more fall arresting devices to the connector. In some such examples, as described in detail below, the locking mechanisms may be positioned within interior portions of the first side of the connector so as to allow the one or more fall arresting devices to pivot freely about the ends of the connector.

Additionally or alternatively, the connectors described here may include a second pin configured to lock into a second side of the base portion using one or more locking mechanisms. The second pin may be used to conveniently and releasably attached the connector to a safety harness of a worker.

In one example, this disclosure describes a connector for coupling fall arresting devices to a safety harness, the connector includes a pin having a locking notch, and a base defining a first side. The first side of the base portion includes a plurality of first-side receiving portions extending outwardly from the base and spaced apart from each other to define a plurality of first-side openings for receiving one or more connection points of respective ones of the fall arresting devices. The plurality of first-side receiving portions includes a first receiving portion defining a first receiving channel, the first receiving portion defining a first end of the first side; a second receiving portion defining a second receiving channel, the second receiving portion defining a second end of the first side; and a third receiving portion defining a third receiving channel, the third receiving portion positioned between the first and second receiving portions. The pin is slidably connected to the plurality of first-side receiving portions and spanning the plurality of first-side openings and extending through the first, second, and third receiving channels when the pin is in a fully closed configuration. The first side of the base portion also includes a locking mechanism connected to the third receiving portion, the locking mechanism configured to releasably engage with the locking notch of the pin when the pin is in the fully closed configuration to prevent the pin from being slidably withdrawn through the third receiving channel.

In one example, this disclosure describes a connector for coupling fall arresting devices to a safety harness, the connector includes a first pin having a first locking notch, a second pin having a second locking notch, and a base defining a first side and a second side opposite the first side. The first side of the base portion includes a plurality of first-side receiving portions extending outwardly from the base and spaced apart from each other to define a plurality of first-side openings for receiving one or more connection points of respective ones of the fall arresting devices. The plurality of first-side receiving portions includes a first receiving portion defining a first receiving channel, the first receiving portion defining a first end of the first side; a second receiving portion defining a second receiving channel, the second receiving portion defining a second end of the first side; and a third receiving portion defining a third receiving channel, the first pin slidably connected to the plurality of first-side receiving portions and spanning the plurality of first-side openings and extending through the first, second, and third receiving channels when the first pin is in a fully closed configuration. The first side of the base portion includes a first locking mechanism connected to one of the first, second, or third receiving portions, the first locking mechanism configured to releasably engage with the first locking notch of the first pin when the first pin is in the closed configuration to prevent the first pin from being slidably withdrawn through at least one of the first, second, or third receiving channels. The second side of the base includes a fourth receiving portion and a fifth receiving portion extending outwardly from the base and spaced apart from each other to define a second-side opening for coupling the connector to the safety harness, the fourth receiving portion defining a fourth receiving channel, the fifth receiving portion defining a fifth receiving channel, the second pin slidably connected to the fourth and fifth receiving portions and spanning the second-side opening and extending through the fourth and fifth receiving channels when the second pin is in a fully closed configuration. The second side of the base also includes a second locking mechanism connected to the fourth receiving portion, the second locking mechanism configured to releasably engage with the second locking notch of the second pin when the second pin is in the fully closed configuration to prevent the second pin from being slidably withdrawn through the fourth receiving channel.

In one example, this disclosure describes a system that includes a safety harness including a strong point for connecting the safety harness to additional safety equipment; at least one fall arresting device, each fall arresting device including a connection point; and a connector that includes a pin having a locking notch, and a base defining a first side. The first side of the base portion includes a plurality of first-side receiving portions extending outwardly from the base and spaced apart from each other to define a plurality of first-side openings for receiving one or more connection points of respective ones of the fall arresting devices. The plurality of first-side receiving portions includes a first receiving portion defining a first receiving channel, the first receiving portion defining a first end of the first side; a second receiving portion defining a second receiving channel, the second receiving portion defining a second end of the first side; and a third receiving portion defining a third receiving channel, the third receiving portion positioned between the first and second receiving portions. The pin is slidably connected to the plurality of first-side receiving portions and spanning the plurality of first-side openings and extending through the first, second, and third receiving channels when the pin is in a fully closed configuration. The first side of the base portion also includes a locking mechanism connected to the third receiving portion, the locking mechanism configured to releasably engage with the locking notch of the pin when the pin is in the fully closed configuration to prevent the pin from being slidably withdrawn through the third receiving channel. The connection point of the at least one fall arresting device received by one of the plurality of first-side openings on the first side of the connector. The pin, when in the fully closed configuration, connecting the connection point to the connector to prevent the at least one fall arresting device from being disconnected from the connector, the strong point of the of the safety harness releasably secured to the second-side of the connector.

In one example, this disclosure describes a system that includes a safety harness comprising a strong point for connecting the safety harness to additional safety equipment, at least one fall arresting device, each fall arresting device comprising a connection point, and a connector. The connector includes a first pin having a first locking notch, a second pin having a second locking notch, and a base defining a first side and a second side opposite the first side. The first side of the base portion includes a plurality of first-side receiving portions extending outwardly from the base and spaced apart from each other to define a plurality of first-side openings for receiving one or more connection points of respective ones of the fall arresting devices. The plurality of first-side receiving portions includes a first receiving portion defining a first receiving channel, the first receiving portion defining a first end of the first side; a second receiving portion defining a second receiving channel, the second receiving portion defining a second end of the first side; and a third receiving portion defining a third receiving channel, the first pin slidably connected to the plurality of first-side receiving portions and spanning the plurality of first-side openings and extending through the first, second, and third receiving channels when the first pin is in a fully closed configuration. The first side of the base portion includes a first locking mechanism connected to one of the first, second, or third receiving portions, the first locking mechanism configured to releasably engage with the first locking notch of the first pin when the first pin is in the closed configuration to prevent the first pin from being slidably withdrawn through at least one of the first, second, or third receiving channels. The second side of the base includes a fourth receiving portion and a fifth receiving portion extending outwardly from the base and spaced apart from each other to define a second-side opening for coupling the connector to the safety harness, the fourth receiving portion defining a fourth receiving channel, the fifth receiving portion defining a fifth receiving channel, the second pin slidably connected to the fourth and fifth receiving portions and spanning the second-side opening and extending through the fourth and fifth receiving channels when the second pin is in a fully closed configuration. The second side of the base also includes a second locking mechanism connected to the fourth receiving portion, the second locking mechanism configured to releasably engage with the second locking notch of the second pin when the second pin is in the fully closed configuration to prevent the second pin from being slidably withdrawn through the fourth receiving channel. The connection point of the at least one fall arresting device received by one of the plurality of first-side openings on the first side of the connector. The first pin, when in the fully closed configuration, connecting the connection point to the connector to prevent the at least one fall arresting device from being disconnected from the connector. The strong point of the of the safety harness received by the second-side opening on the second side of the connector, the second pin, when in the closed configuration, connecting the strong point to the connector to prevent the safety harness from being disconnected from the connector.

In one example, this disclosure describes a method that includes positioning a pin of a connector of claim 1 to a fully open configuration. The connector includes the pin having a locking notch, and a base defining a first side. The first side of the base portion includes a plurality of first-side receiving portions extending outwardly from the base and spaced apart from each other to define a plurality of first-side openings for receiving one or more connection points of respective ones of the fall arresting devices. The plurality of first-side receiving portions includes a first receiving portion defining a first receiving channel, the first receiving portion defining a first end of the first side; a second receiving portion defining a second receiving channel, the second receiving portion defining a second end of the first side; and a third receiving portion defining a third receiving channel, the third receiving portion positioned between the first and second receiving portions. The pin is slidably connected to the plurality of first-side receiving portions and spanning the plurality of first-side openings and extending through the first, second, and third receiving channels when the pin is in a fully closed configuration. The first side of the base portion also includes a locking mechanism connected to the third receiving portion, the locking mechanism configured to releasably engage with the locking notch of the pin when the pin is in the fully closed configuration to prevent the pin from being slidably withdrawn through the third receiving channel. When the pin is in the fully open configuration, the pin is received by only the first receiving channel and does not span the plurality of first-side openings. The method also includes positioning a first connection point of a first fall arresting device within a first opening of the plurality of first-side openings, the first opening defined by a separation distance between the first receiving portion and the third receiving portion; slidably advancing the pin to a partially closed configuration wherein the pin is received by the first and third receiving channels and spans a first opening of the plurality of first-side openings defined by the first and third receiving portions, the pin captures the first connection point of the first fall arresting device to prevent the first fall arresting device from being disconnected from the connector; positioning a second connection point of a second fall arresting device within a second opening of the plurality of first-side openings; and slidably advancing the pin to the fully closed configuration where the pin is received by the first, second, and third receiving channels and spans the plurality of first-side openings, the pin captures the second connection point of the second fall arresting device to prevent the second fall arresting device from being disconnected from the connector.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure describes connectors for use with fall protection equipment and various types of fall protection systems that may be used to provide fall protection to an individual user working in at dangerous heights. Fall protection equipment may generally refer to a device used to connect a user (e.g., a worker) to a support structure for the purpose of securing the user to the support structure in the event of a fall. Examples of fall protection equipment include a variety of carabiners (also referred to as "spring hooks" or "snap hooks"), shackles, carrier sleeves, safety harnesses, fall arresting devices such as a self-retracting lifeline (SRL), or other devices that are capable of connecting a user to and disconnecting a user from the support structure. A support structure may include an anchor or another structure capable of supporting the weight of a user in the event of a fall. In some examples, the different pieces of equipment may be linked together using one or more connectors. For example, one or more fall arresting devices such as an SRL may be connected to the safety harness of a worker using a connector configured to secure the fall arresting device(s) to a strong point of the safety harness. To ensure the safety of the user, the connector must be reliable and able to withstand the forces of a fall. Further, to ensure proper attachment, the connector should be user friendly such that it is easy to install and confirm proper assembly.

FIGS. 1-7 provide various views of an example connector 10 that may be used to connect a safety harness to one or more fall arresting devices such as an SRL. In particular, FIGS. 1-4 are perspective views of an example connector 10 that includes a base 12, a first pin 18, and a second pin 20. FIGS. 5A and 5B are cross-sectional views of FIG. 1 through line A-A illustrating various features of the described locking mechanisms. FIGS. 6A-6C are perspective views of first pin 18 and FIG. 7A-7C are perspective views of second pin 18.

As used herein, the designation of a first, a second, or a third element and the like is used to merely distinguish one element from another. The terms are not used in the quantitative sense, used to imply or limit the total number of elements present, or used imply a particular order of the numbered elements in the described device.

Figure 1:
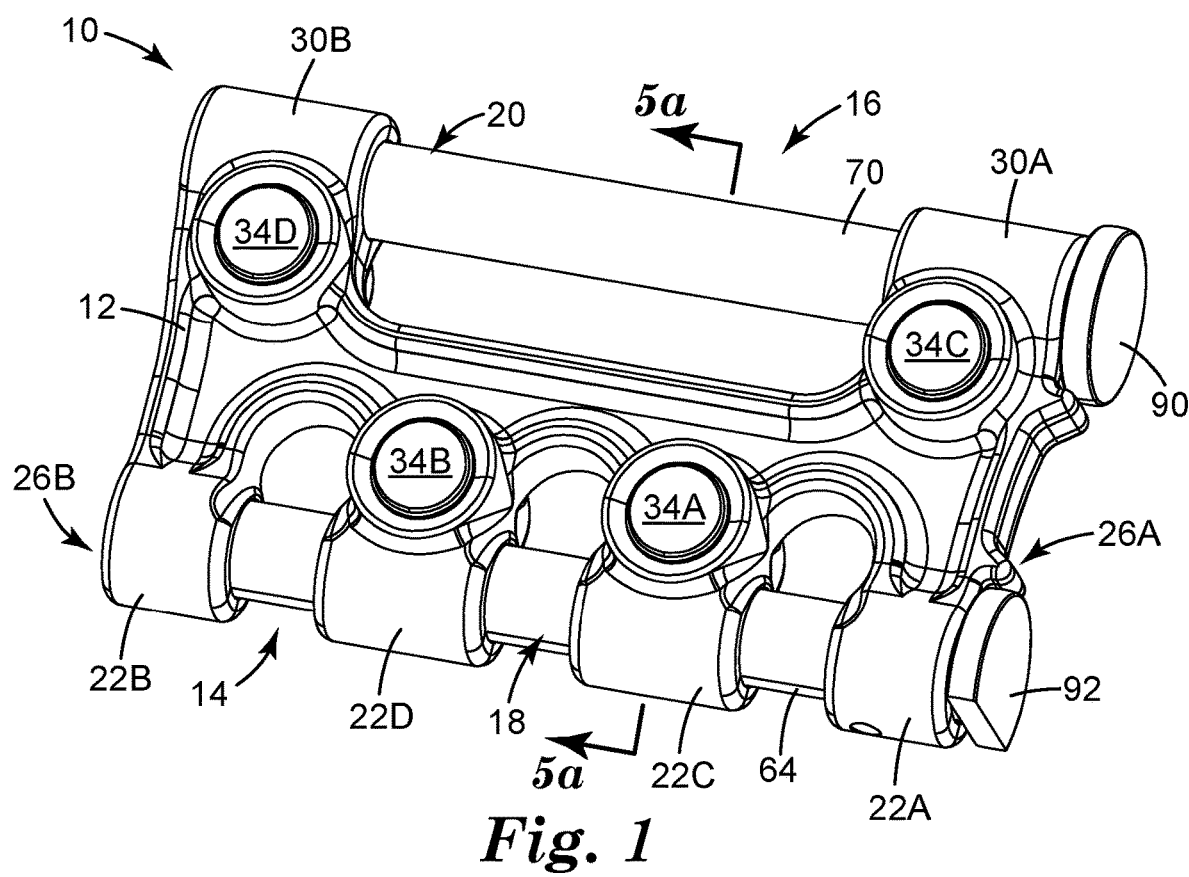
FIG. 1 is a perspective view of an example connector as described herein in a fully closed configuration.
Figure 2:
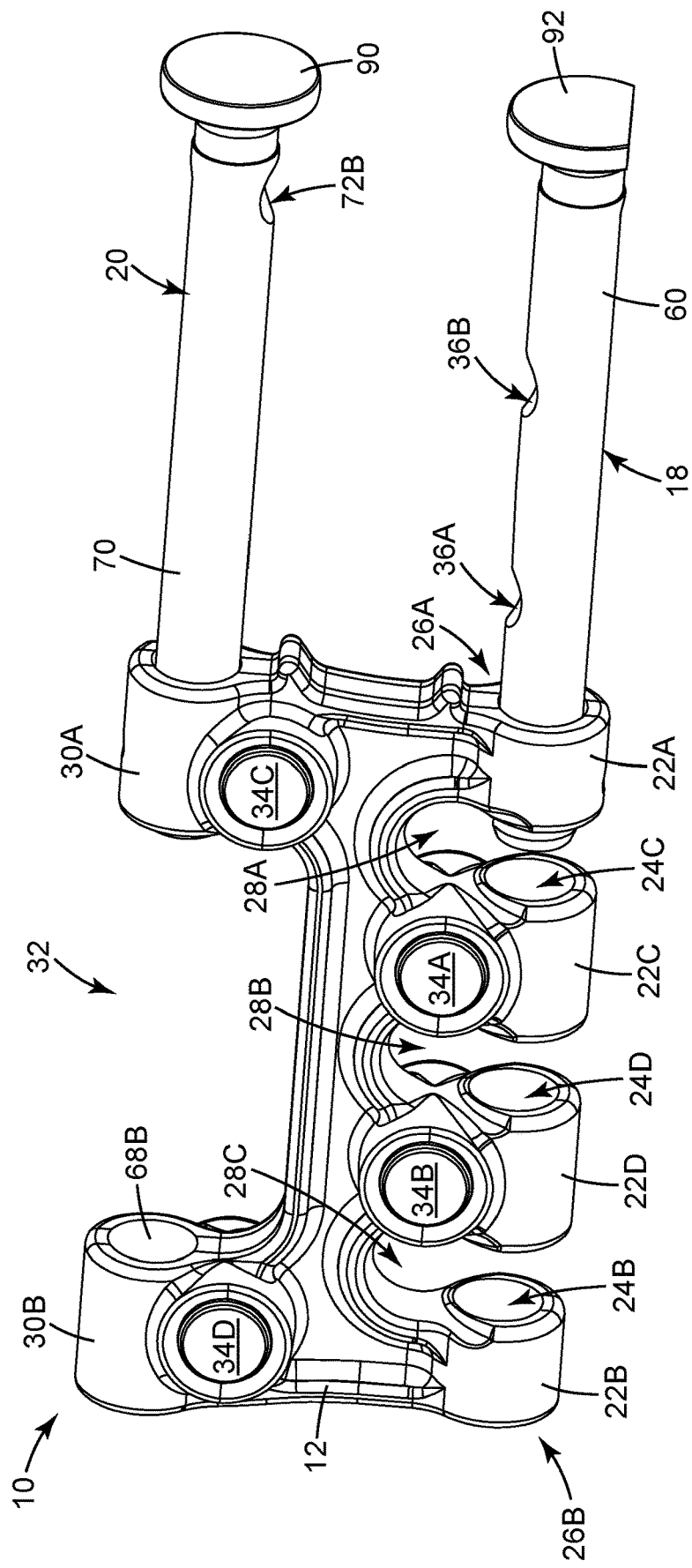
FIG. 2 is a perspective view of the example connector of FIG. 1 in a fully open configuration.
Figure 3:
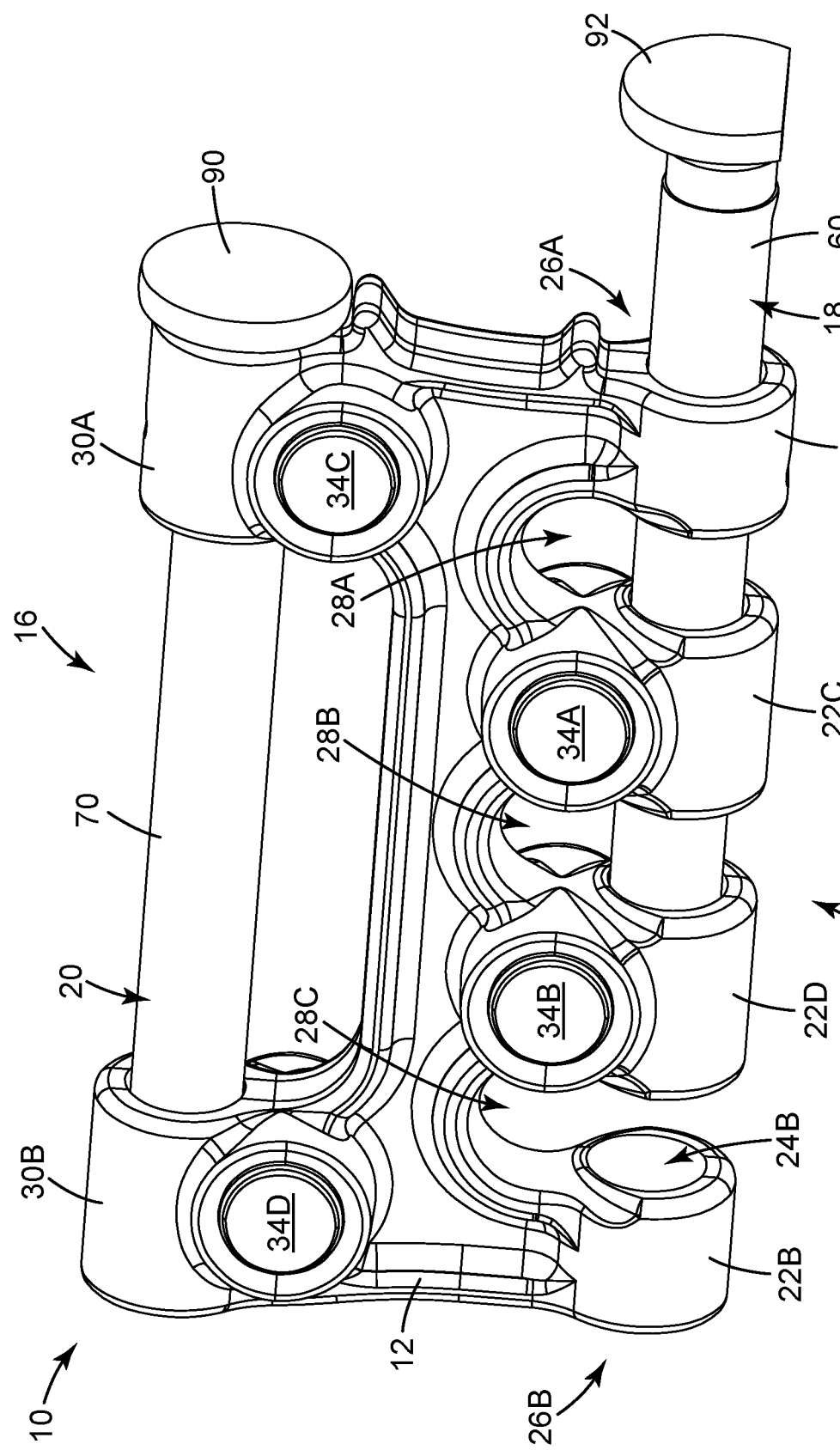
FIG. 3 is a perspective view of the example connector of FIG. 1 in a partially closed configuration.
Figure 4:
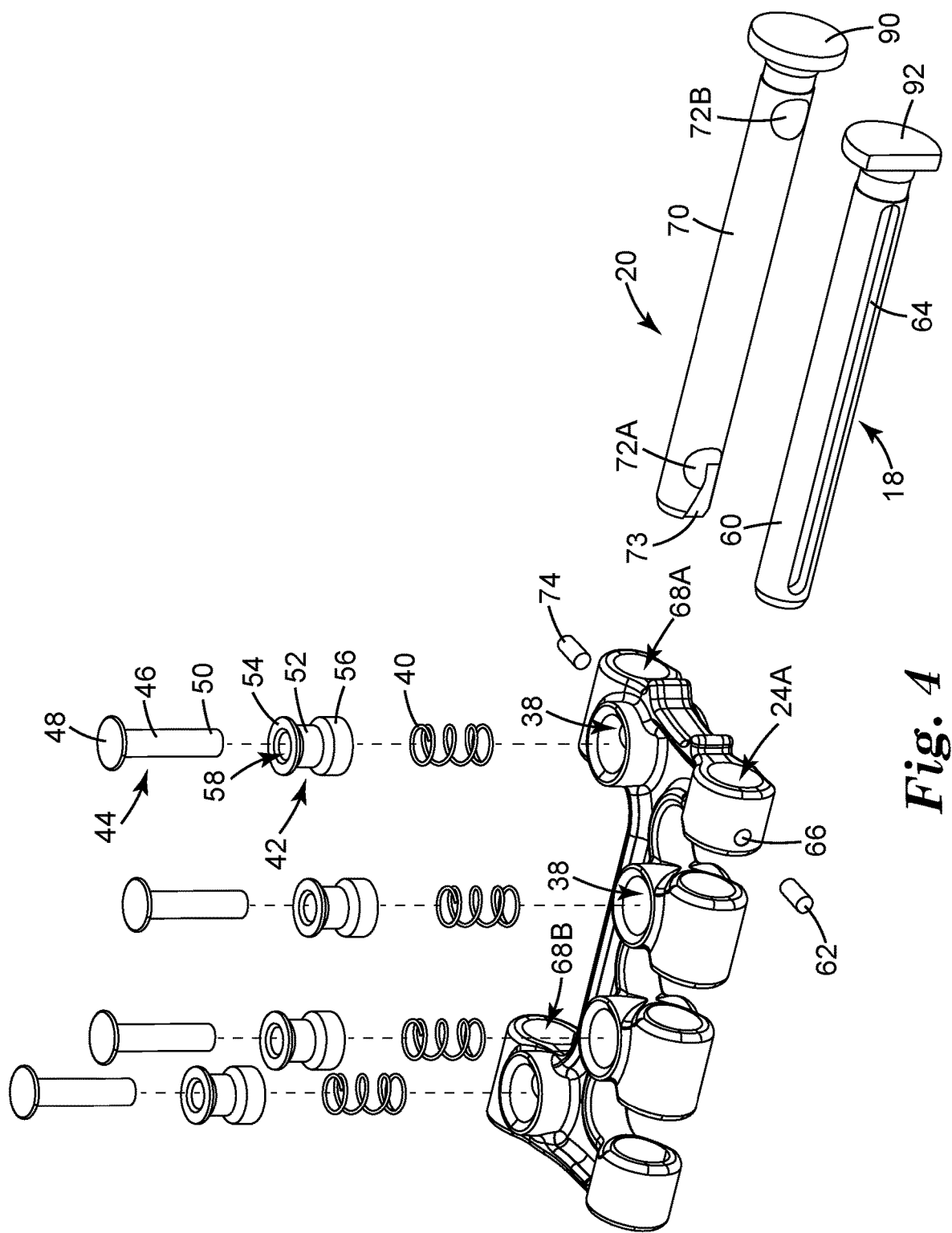
FIG. 4 is a perspective exploded view of the example connector of FIG. 1.

In the example shown in the FIGS. 1-4, connector 10 includes base 12 that provides a robust and reliable connector frame. As shown in FIG. 1, base 12 defines a first side 14 and a second side 16 for the connector 10. First side 14 of base 12 is a fall arresting device-facing side that includes a plurality of first-side receiving portions 22A-22D formed as brackets extending from first side 14 and spaced apart from each other to define a plurality of first-side openings 28A-28C. Each of plurality of first-side openings 28A-28C may be configured to receive one or more fall arresting devices, such as an SRL. Second side 16 of base 12 is a harness-facing side that includes a plurality of second-side receiving portions 30A and 30B formed as brackets extending from second side 16 and spaced apart from each other to define a second-side opening 32 (labeled in FIG. 2) for coupling to a safety harness. In the example, connector 10 provides a twin pin mechanism in which first pin 18 slidably and operably connects to plurality of first-side receiving portions 22A-22D and second pin 20 slidably and operably connects to second-side receiving portions 30A and 30B independent of first pin 18. However in other examples, connector 10 may only include first pin 18 and utilize a portion of second side 16 of base 12 to attach connector 10 to a safety harness.

As shown in FIGS. 1-4, first pin 18 is configured to traverse channels formed by first-side receiving portions 22A-22D, thereby operably opening and closing first-side openings 28A-28C. For example, first-side receiving portions 22A-22D may extend outwardly from base 12, spaced apart from each other to define plurality of first-side openings 28A-28C. Plurality of first-side receiving portions 22A-22D may include a first receiving portion 22A defining a first receiving channel 24A and a second receiving portion 22B defining a second receiving channel 24B. First receiving portion 22A and second receiving portion 22B define the respective first end 26A and a second end 26B of first side 14 for engaging pin 18. Plurality of first-side receiving portions 22A-22D also include at least one interior receiving portion (e.g., at least one of third receiving portion 22C and fourth receiving portion 22D) positioned in between first and second receiving portions 22A and 22B that form the first and second ends 26A and 26B of first side 14.

In the examples shown in FIGS. 1-4, plurality of first-side receiving portions 22A-22D include third and fourth receiving portions 22C and 22D that are each positioned between first and second receiving portions 22A and 22B. However, in other examples, connector 10 may include only one interior receiving portion (e.g., third receiving portion 22A) or may include more than two interior receiving portions deepening on how may first-side openings 28A-28C are desired or how may fall arresting devices are intended to be connected to first side 14. Each of third and fourth receiving portions 22C and 22D define a respective third and fourth receiving channel 24C and 24D.

First side 14 may also include one or more locking mechanisms 34A and 34B configured to releasably engage first pin 18 when the pin is in a fully closed configuration (e.g., the configuration FIG. 1) to prevent first pin 18 from being slidably withdrawn (e.g., transitioned towards a fully open configuration) through one or more of receiving channels 24A-24D. For example, as shown in FIGS. 1-4, first side 14 includes a first and second locking mechanism 34A and 34B connected to third and fourth receiving portions 22C and 22D respectively. In other examples, first side 14 may only include one locking mechanism or may be configured such that first and second locking mechanisms 34A and 34B are connected to first and second receiving portions 22A and 22B.

In some examples, first and second locking mechanisms 34A and 34B may include a push-button style release mechanism that interacts with one or more locking notches 36A and 36B defined by first pin 18. For example, first and second locking mechanisms 34A and 34B may each include a generally cylindrical locking channel 38 that extends perpendicular to the respective third or fourth receiving channels 24C and 24D such that the locking channel 38 is in fluid communication with the respective receiving channel 24C or 24D. Locking channels 38 may each include a constriction 39 at one end that defines a reduction in the diameter of the locking channel 38.

Each of first and second locking mechanisms 34A and 34B may configured to receive a biasing member 40 (e.g., a spring), an engaging member 42, and a rivet 44, which form the locking mechanism. Rivet 44 includes a shaft 46 having a head 48 opposite a deformable end 50. The engaging member 42 includes a tube portion 52 to which a first flanged portion 54 and a second flanged portion 56 are connected at opposite ends. A channel 58 extends through engaging member 42 that receives shaft 46 of rivet 44. Biasing member 40 is configured contact and engage with second flanged portion 56 and constriction 39 within locking channel 38 when both biasing member 40 and engaging member 42 are received within locking channel 38.

When fully assembled, rivet 44 extends through the channel 58 of engaging member 42, the center of biasing member 40, and constriction 39 of locking channel 38. Deformable end 50 of rivet 44 is then deformed to prevent deformable end 50 from being withdrawn back through constriction 39. Head 48 and deformed end 50 of rivet 44 thereby capture and retain engaging member 42 and biasing member 40 within locking channel 38.

Figure 5A:
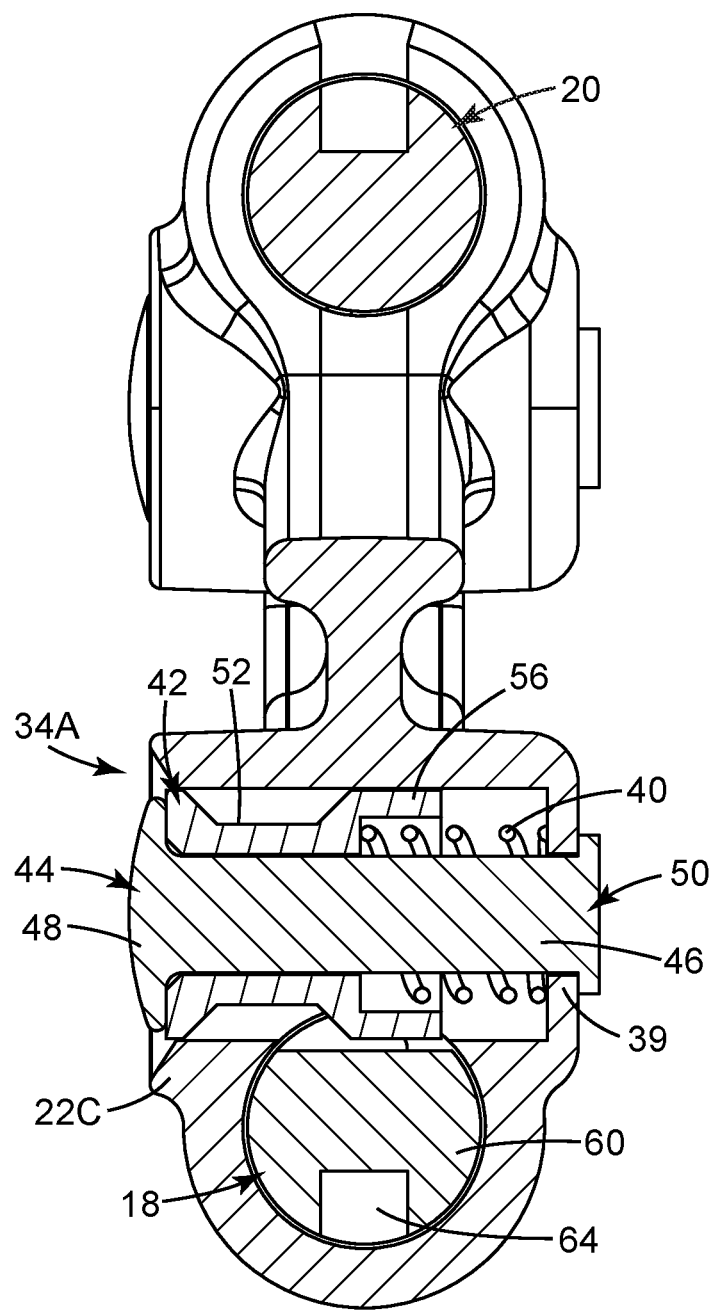
FIG. 5A is a cross-sectional view of the example connector of FIG. 1 along line A-A with the locking mechanism in the locked state.
Figure 5B:
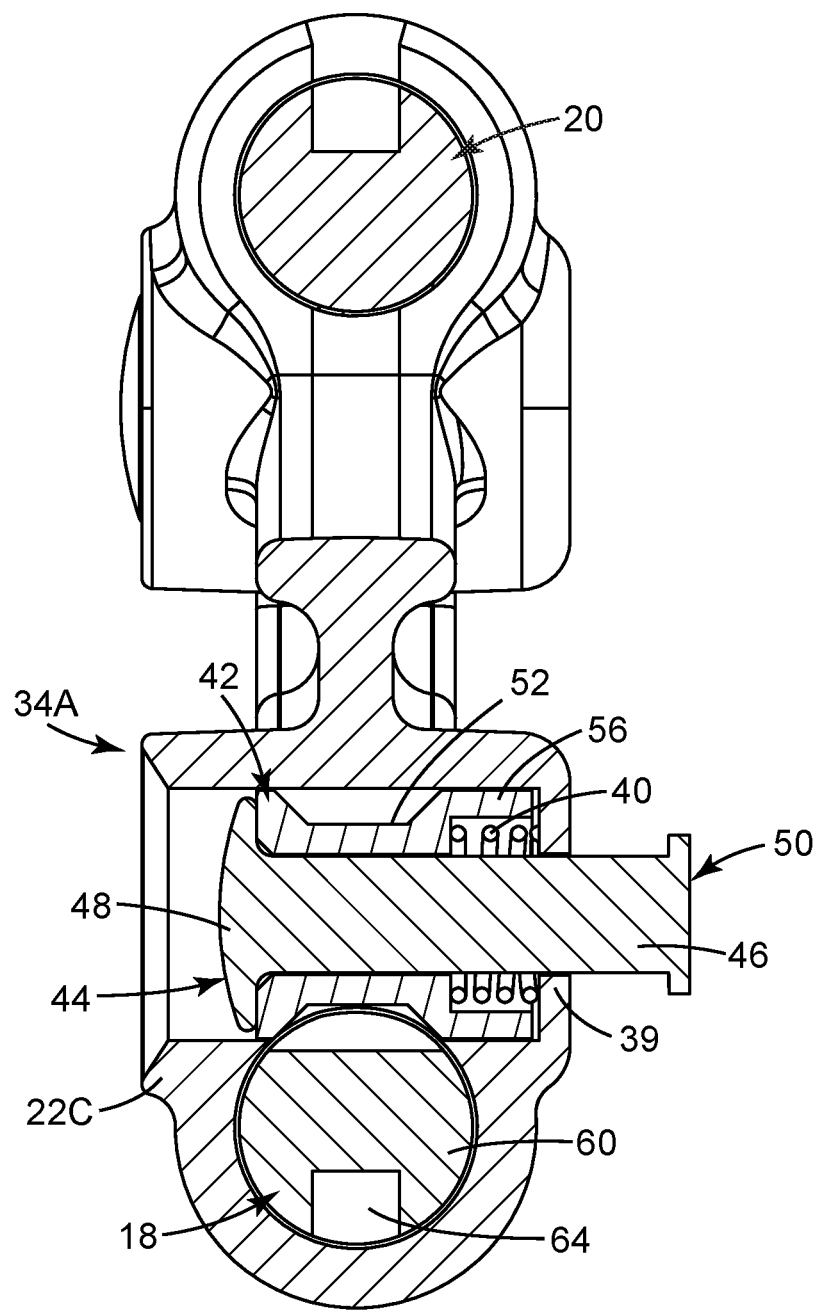
FIG. 5B is a cross-sectional view of the example connector of FIG. 1 along line A-A with the locking mechanism in the unlocked state.
Figure 6A:
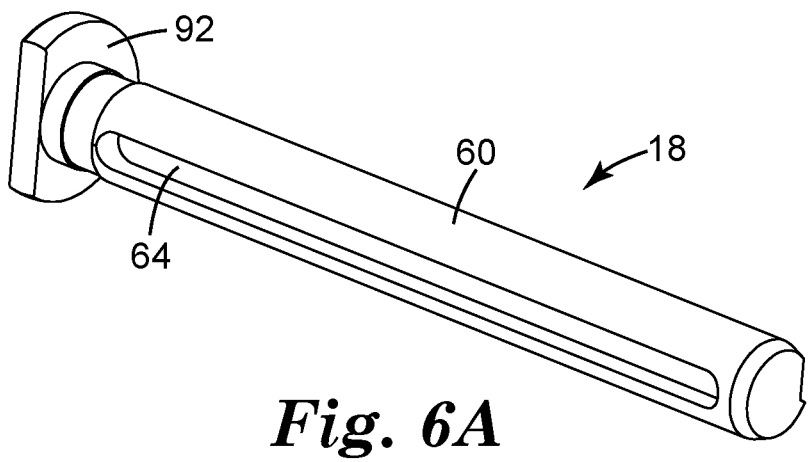
FIGS. 6A-6C are perspective views of the first pin of the example connector of FIG. 1.
Figure 6B:
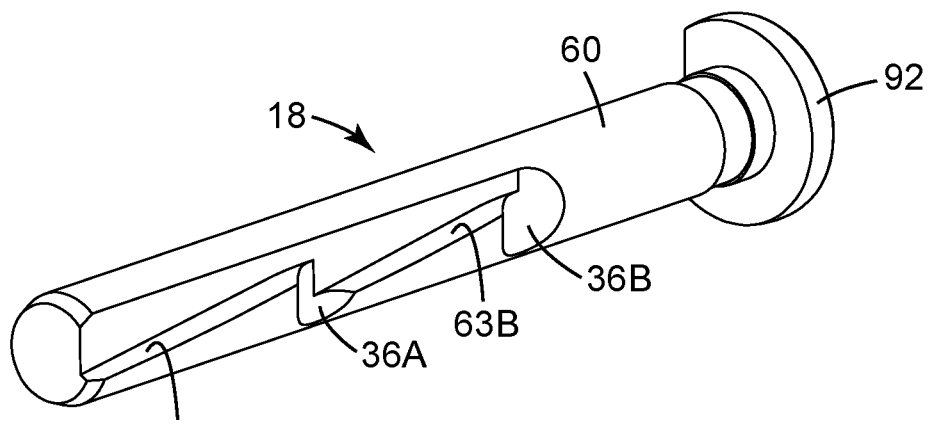
Figure 6C:
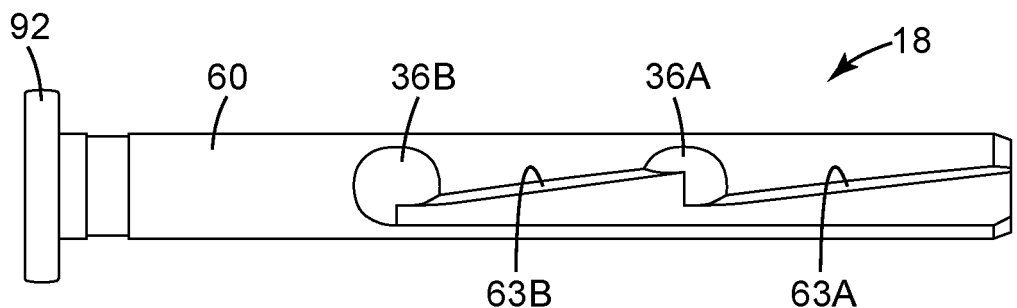

During use, while in a non-compressed or locked state, second flanged portion 56 of engaging member 42 protrudes into the receiving channel to which the locking mechanism is connected. For example, FIGS. 5A and 5B illustrate cross-sectional views taken along line A-A of FIG. 1. FIG. 5A illustrates the non-compressed or locked state of first locking mechanism 34A within third receiving portion 22C. As shown in FIG. 5A, while in the locked position, a portion of second flanged portion 56 extends into third receiving channel 24C. While third receiving channel 24C is sized to receive the shaft 60 of first pin 18, the intrusion of second flanged portion 56 into third receiving channel 24C effectively reduces the bore size of third receiving channel 24C and prohibits shaft 60 of first pin 18 from being slidably withdrawn through of third receiving channel 24C.

First pin 18 includes one or more locking notches 36A and 36B formed along shaft 60. Locking notches 36A and 36B may be sized such that when a respective notch (e.g., second locking notch 36B) is introduced into third receiving channel 24C, locking notch 36B can receive second flanged portion 56 of engaging member 42. As shown in FIG. 5A, when locking notch 36B properly aligns with first locking mechanism 34A, flanged portion 56 of engaging member 42 will remain in the locked position with second flanged portion 56 protruding into third receiving channel 24C the flange is received by locking notch 36. With locking mechanism 34A in the locked position, second flanged portion 56 prohibits axial movement of first pin 18 within third receiving channel 24C.

In order to slidably withdraw shaft 60 of first pin 18 through third receiving channel 24C, head 48 of rivet is pressed causing biasing member 40 to compress and allowing engagement member 42 to slide within locking channel 38 towards constriction 39. As engagement member 42 is advanced towards constriction 50, tube portion 52 becomes aligned with third receiving channel 24C thereby clearing third receiving channel 24C of any obstructions from engaging member 42. This position may be considered as the compressed or unlocked position and is illustrated for first locking mechanism 34A in FIG. 5B. With second flanged portion 56 no longer protruding into third receiving channel 24C, shaft 60 of first pin 18 may be freely slidably advanced (e.g., transitioned towards a fully closed configuration) or be withdrawn (e.g., transitioned towards a fully open configuration) through third receiving channel 24C, provided second locking mechanism 34B is not in a locked configuration.

In some examples, first pin 18 may include one or more ramp portions 63A and 63B. As shown in FIG. 5B, a first ramp portion 63A extends from the leading end of shaft 60 to first locking notch 36A and a second ramp portion 63B extends from first locking notch 36A to second locking notch 36B. First and second ramp portions 63A and 63B may allow for first pin 18 to be advanced past first and second locking mechanisms 34A and 34B without needing to initially unlock first or second locking mechanisms 34A and 34B to advance first pin within first or second receiving channels 24A and 24B. For example, first ramp 63A may initially contact and depress engaging member 42 of first locking mechanism 34A to allow first pin 18 to advance through third receiving channel 24C until first locking notch 36A aligns and engages with engaging member 42, at which point engaging member 42 will seat within first locking notch 36A preventing first pin from being withdrawn from third receiving channel 24C. If an advancing force (e.g., towards the fully closed configuration) is applied to first pin 18, second ramp portion 63B will depress engaging member 42 of first locking mechanism 34A and first ramp portion 63A may likewise interact with engaging member 42 of second locking mechanism 34B to allow first pin 18 to advance through both third and fourth receiving channels 24C and 24D towards the fully closed configuration.

In some examples, to assist with proper alignment of the one or more locking notches 36A and 36B of first pin 18 relative to engaging member 42 as first pin 18 advances through third receiving channel 24C, connector 10 may include an alignment pin 62 configured to engage with a longitudinal slot 64 that extends along a portion of shaft 60 of first pin 18. For example, first receiving portions 22A may define a lateral channel 66 that aligns and extends substantially perpendicular to first receiving channel 24A. First pin 18 may be advanced through first receiving channel 24A until longitudinal slot 64 aligns with lateral channel 66. Alignment pin 62 may then be inserted into lateral channel 66 and longitudinal slot 64 thereby preventing first pin 18 from rotating within first receiving channel 24A. By preventing first pin 18 from rotating, locking notches 36A and 36B are assured to properly align with the associated locking mechanisms 34A and 34B as first pin 18 is advanced through the plurality of first-side receiving channels 24A-24D.

Additionally, in some examples, alignment pin 62 may also act as a retaining pin to prevent first pin 18 from being completely removed from base 12 once installed. Preventing full or partial disassembly of connector 10 may help prevent inadvertent loss of first pin 18 or second pin 20 or the inadvertent switching of first and second pins 18 and 20. In some examples, alignment pin 62 may be fixed within first receiving portion 22A once first pin 18 has been assembled. Suitable fixing techniques may include, but are not limited to, welding, gluing, crimping, or the like.

In some examples, at least two locking mechanisms 34A-34D are included on each side 14 and 16 of base 12. For example, first side 14 include first and second locking mechanisms 34A and 34B and second side 16 includes third and fourth locking mechanisms 34C and 34D. Each locking mechanism 34A-34D operates independently of the other locking mechanisms and may be configured to interact with a corresponding locking notch 36A and 36B or 72A and 72B on first pin 18 or second pin 20. Therefore, using FIG. 1 as an example, when in first pin 18 is advanced to a fully closed configuration, both first and second locking mechanisms 34A and 34B will prohibit axial movement of first pin 18. This dual-locking mechanism requires the user to push heads 48 of the respective rivets 44 of both first and second locking mechanisms 34A and 34B independently to unlock the two mechanisms in order to move first pin 18. By including at least two locking mechanisms 34A-34D on each side 14 and 16, connector 10 provides a redundant safety feature and prevents accident unlocking of connector 10 in the case where any individual locking mechanism 34A-34D is inadvertently unlocked or becomes damaged during use.

In some examples, first and second locking mechanisms 34A and 34B may be connected to one or more of the interior receiving portions 22C and 22D as opposed to first and second receiving portions 22A and 22B forming first and second ends 26A and 26B of first side 14. As described further below, by forming first and second locking mechanisms 34A and 34B within interior receiving portions 22C and 22D, connector 10 may permit a greater range of motion when a fall arresting device is attached to connector 10. For example, the relative size and positioning of first and second locking mechanisms 34A and 34B relative to third and fourth receiving portions 22C and 22D may cause the receiving portions to be somewhat large or bulky in order for the locking mechanism to function properly and maintain sufficient structural integrity to withstand the impact of a fall. By incorporating the locking mechanisms within the exterior receiving portions 22A and 22B of first side, the bulk associated with the locking mechanism may inhibit the ability of the attached fall arresting device such as an SRL from pivoting around first and second ends 26A and 26B of first side 14. During use of the fall protection system, the reduced mobility of the SRL relative to connector 10 may lead to kinking or increased drag associated with the extension or retraction of the lifeline. By incorporating first and second locking mechanisms 34A and 34B within the interior receiving portions 22C and 22D, the size of first and second receiving portions 22A and 22B may be relatively thin and less bulky, permitting the connection point of the SRL to freely pivot around first and second end 26A and 26B, which are primarily defined by first and second receiving portions 22A and 22B. By allowing the SRL to pivot, the chance of the SRL kinking or otherwise increasing the drag force reduces.

As shown in FIGS. 1-4, second pin 20 is configured to traverse channels formed by second-side receiving portions 30A-30B, thereby operably opening and closing second-side opening 32. Second side 16 includes a pair of receiving portions that includes a fifth receiving portion 30A and a sixth receiving portion 30B extending outwardly from base 12 and spaced apart from each other to define second-side openings 32 for coupling connector 10 to a safety harness. Fifth and sixth receiving portion 30A and 30B each define a respective receiving channel 68A and 68B configured to receive part of the shaft 70 of second pin 20. Similar to first pin 18, shaft 70 of second pin 20 may define at least one locking notch 72A and 72B configured to interact with one or more locking mechanisms 34C and 34D connected to either of receiving portions 30A and 30B. Second pin 20 may be slidably transitioned from a fully open configuration (e.g., the configuration of FIG. 2) to a fully closed and locked configuration (e.g., the configuration of FIG. 1) where second pin 20 spans second opening 32 defined by fifth and sixth receiving portions 30A and 30B.

Figure 7A:
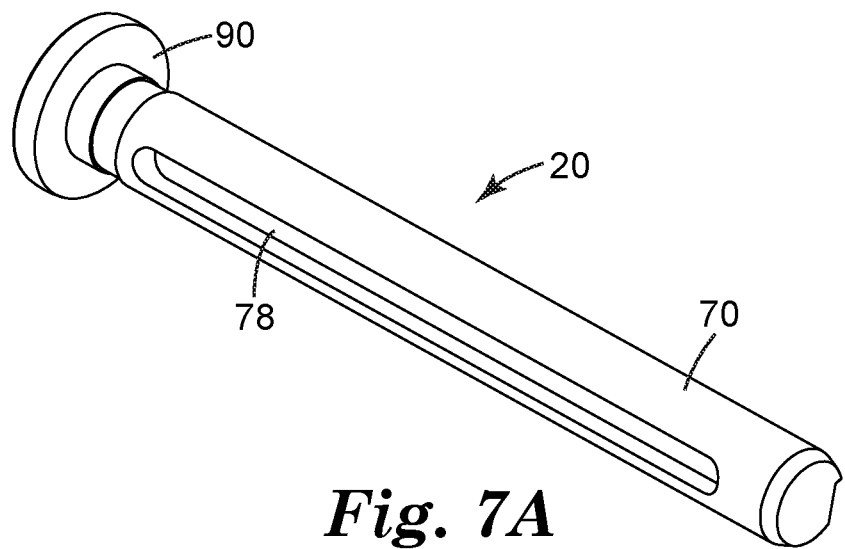
FIGS. 7A-7C are perspective views of the second pin of the example connector of FIG. 1.
Figure 7B:
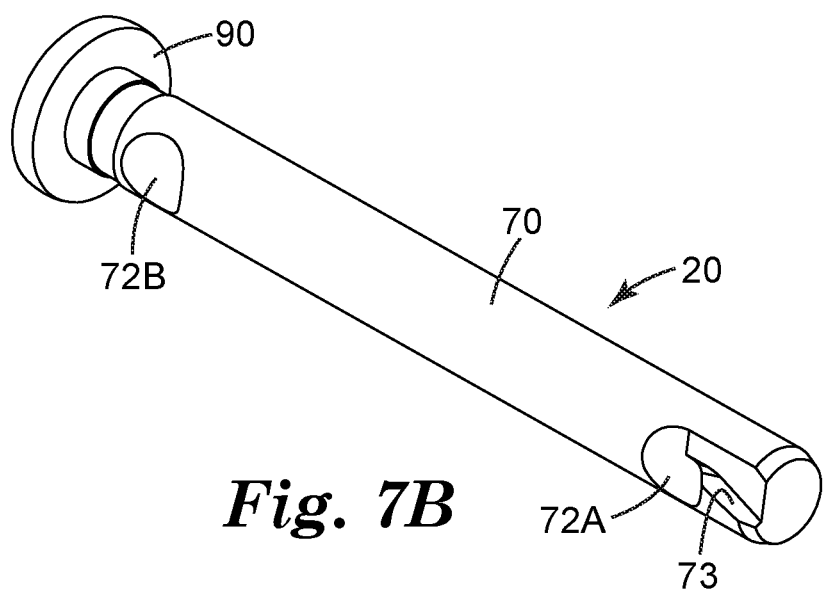
Figure 7C:
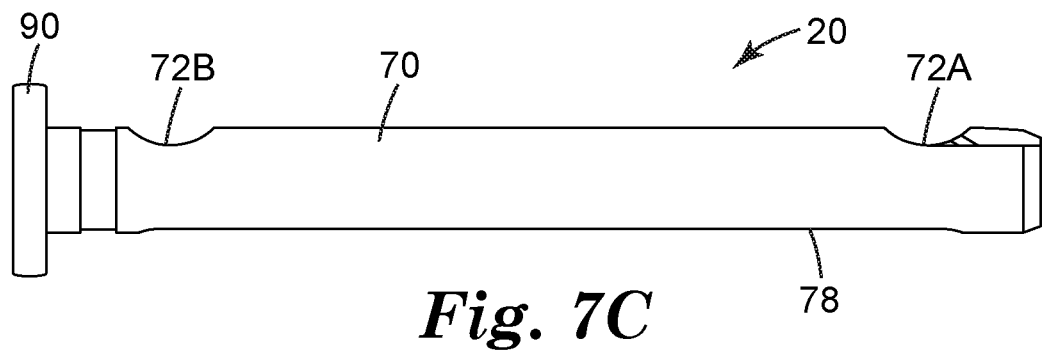

As shown in FIGS. 7A and 7B, shaft 70 may include two locking notches 72A and 72B configured to engage with locking mechanisms 34D and 34C respectively. The operation of locking mechanism 34C and 34D may be substantially similar to the operation of first locking mechanism 34A described above. In some examples, second pin 20 may also define a ramp portion 73 at the leading end of shaft 70 that extends all the way to first locking notch 72A. Ramp portion 73 may allow the leading end of second pin 20 to be advanced past engaging member 42 of fourth locking mechanism 34D until first locking notch 72A aligns and engages with engaging member 42. In such examples, ramp portion 73 may prevent the initial need to unlock fourth locking mechanism 34D when first pin 20 is initially introduced and advanced through sixth receiving channel 68B.

In some examples, fifth receiving portion 30A may also include an alignment pin alignment pin 74 to assist with the proper alignment of locking notches 72A and 72B relative to engaging members 42 of locking mechanisms 34C and 34D as second pin 20 is advanced through one or more of receiving channels 68A and 68B. The operation of alignment pin 74 may be substantially similar to the operation of alignment pin 62 described above with respect to first pin 18. For example, fifth receiving portion 30A may define a lateral channel (not shown in FIGS.) that aligns and extends substantially perpendicular to fifth receiving channel 24A configured to receive alignment pin 74. Second pin 20 may likewise define a longitudinal slot 78 that extends along a portion of shaft 70. Second pin 20 may be advanced through fifth receiving channel 68A until longitudinal slot 78 aligns with the lateral channel. Alignment pin 74 may then be inserted into the lateral channel and longitudinal slot 78 thereby preventing second pin 20 from rotating within fifth receiving channel 68A. Additionally, in some examples, alignment pin 74 may also act as a retaining pin to prevent second pin 20 from being completely removed from base 12 once assembled.

The components of connector 10 (e.g., base 12 or first and second pins 18 and 20) may be formed using any suitable materials or manufacturing techniques. In some examples, the components may include high strength metals or metal alloys including, for example, heat treated aluminum zinc alloy, stainless steel, high strength composites, or the like.

The various features of first side 14 and second side 16 of connector 10 may be incorporated into the connector collectively as shown and described or may be incorporated into a connector independently. For example, a connector as described herein may include and realize the benefits of one or more of the features of first side 14, such as positioning locking mechanisms 34A and 34B within the interior receiving portions 22C and 22D of first side 14, independent of whether connector 10 includes second pin 12 or use a different structure to connect connector 10 to a safety harness of a user. Additionally or alternatively, a connector as described herein may include and realize the benefits of one or more of the features of second side 12, such as being easily attached to a safety harness, independent of whether connector 10 includes all the described features of first pin 12.

In one example, the connectors 10 described herein may be characterized as including a first pin 18 having a locking notch 36B and a base 12 having a first side 14 and a second side 16. The first side 14 of base 12 may include plurality of first-side receiving portions that include at least a first, a second, and a third receiving portion 22A-22C, each defining a respective first, second, and third receiving channel 24A-24C. In such examples, first receiving portion 22A may define a first end 26A of first side 14, second receiving portion 22B may define a second end 26B of first side 14, and third receiving portion 22C may be positioned between first and second receiving portions 22A and 22B. Plurality of first-side receiving portions 22A-22C may be spaced apart from each other in order to define a plurality of first-side openings (e.g., 28A-28C) configured to receive a connection point of a fall arresting device. First pin 18 may be slidably and operably connected to the plurality of first-side receiving portions 22A-22C such that the pin spans plurality of first-side openings (e.g., 28A-28C) and extends through each of the first, second, and third receiving channels 24A-24C when first pin 18 is in a fully closed configuration. Base 12 may include a locking mechanism 34A connected to third receiving portion 22C configured to releasably engage with locking notch 36B of first pin 18 when the pin is in the fully closed configuration to prevent first pin 18 from being slidably withdrawn through third receiving channel 24C.

In another example, the connectors 10 described herein may be characterized as including a first pin 18 having a first locking notch 36B, a second pin 20 having a second locking notch 72B, and a base 12 having a first side 14 and a second side 16. The first side 14 of base 12 may include a plurality of first-side receiving portions that include at least a first, a second, and a third receiving portion 22A-22C, each defining a respective first, second, and third receiving channel 24A-24C. In such examples, first receiving portion 22A may define a first end 26A of first side 14, second receiving portion 22B may define a second end 26B of first side 14, and third receiving portion 22C may be positioned between first and second receiving portions 22A and 22B. The plurality of first-side receiving portions 22A-22C may be spaced apart from each other in order to define a plurality of first-side openings (e.g., 28A-28C) configured to receive a connection point of a fall arresting device. First pin 18 may be slidably and operably connected to the plurality of first-side receiving portions 22A-22C such that first pin 18 spans the plurality of first-side openings (e.g., 28A-28C) and extends through each of the first, second, and third receiving channels 24A-24C when first pin 18 is in a fully closed configuration. Base may include a first locking mechanism 34A connected to one of the first, second, or third receiving portions 22A-22C configured to releasably engage with the first locking notch 36B of first pin 18 when the pin is in the fully closed configuration to prevent the pin from being slidably withdrawn through at least one of the first, second, or third receiving channels 24A-24C.

In such examples, second side 16 of base 12 may include a fourth receiving portion 30A defining a fourth receiving channel 68A and a fifth receiving portion 30B defining a fifth receiving channel 68B. The fourth and fifth receiving portions 30A and 30B may be separated from each other to define a second-side opening 32. Second pin 20 slidably and operably connected to the fourth and fifth receiving portions 30A and 30B such that second pin 20 spans second-side opening 32 and extends through the fourth and fifth receiving channels 68A and 68B when second pin 20 is in a fully closed configuration. Second side 16 of the base includes a second locking mechanism 34C connected to the fourth receiving portion 30A. The second locking mechanism 34C configured to releasably engage with second locking notch 72B of the second pin 20 when second pin 20 is in the closed configuration to prevent second pin 20 from being slidably withdrawn through the fourth receiving channel 68A.

Figure 8:
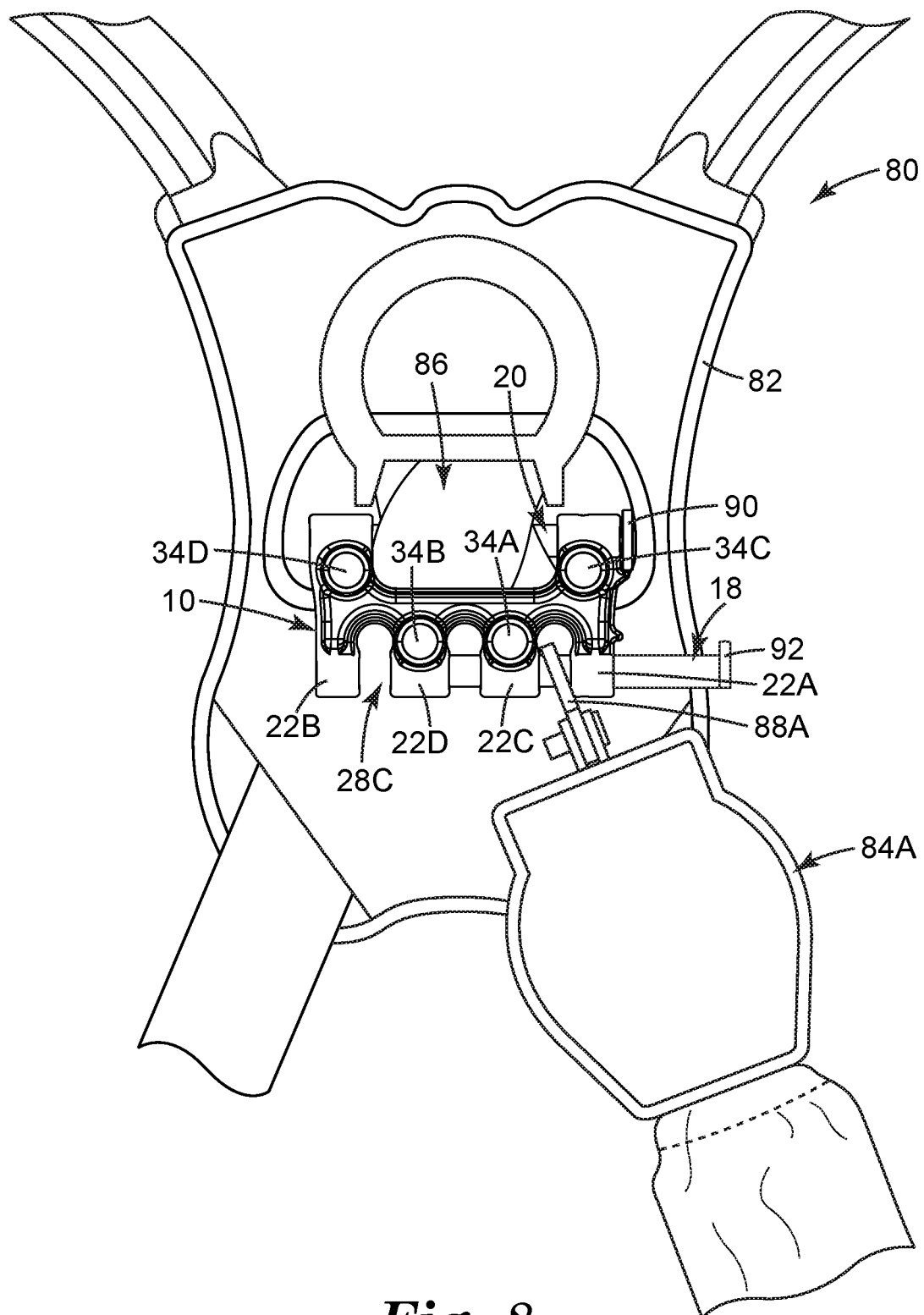
FIG. 8 is a front view of an example fall protection system that includes the example connector of FIG. 1 linking a first fall arresting device to a safety harness.
Figure 9:
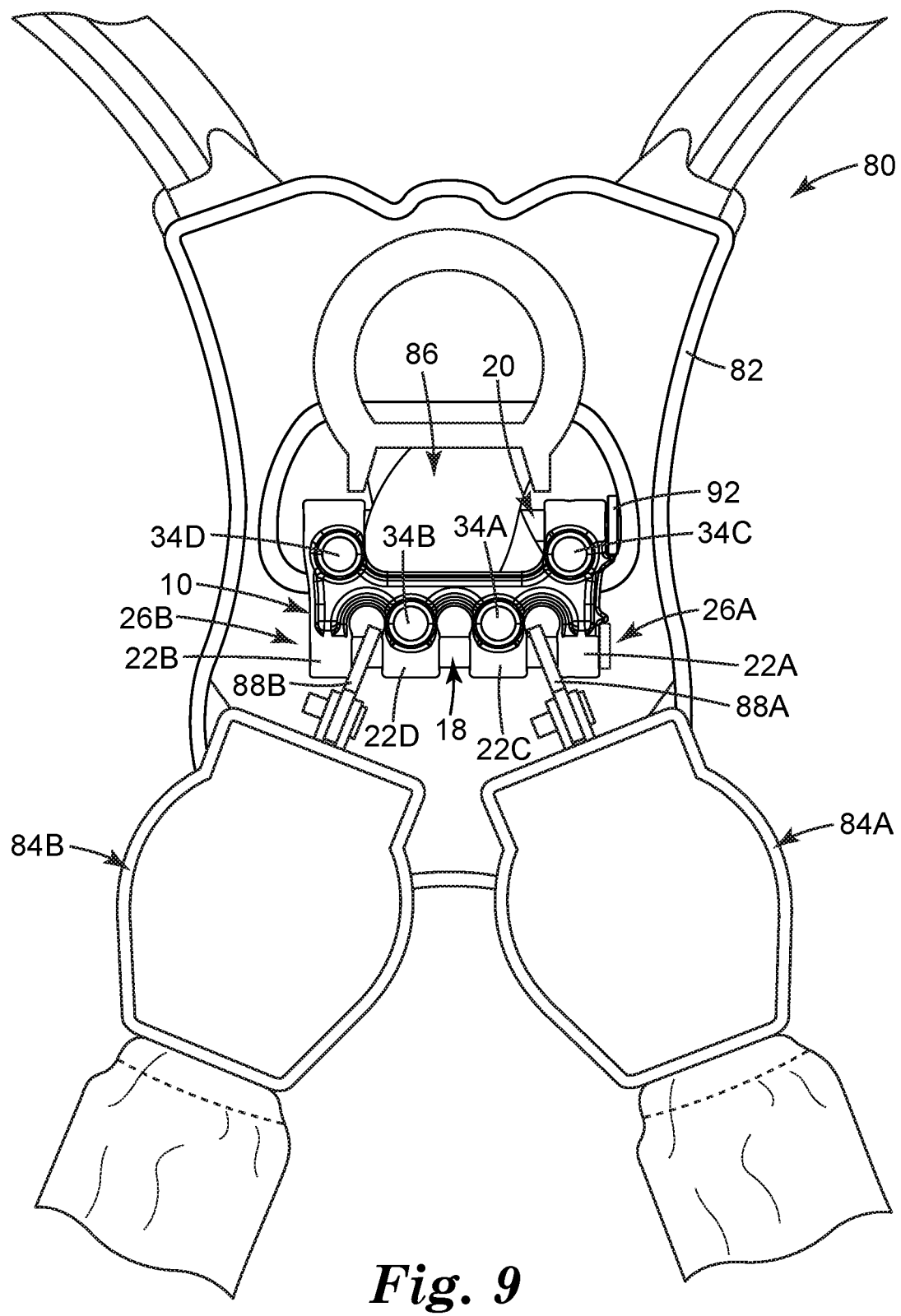
FIG. 9 is a front view of an example fall protection system that includes the example connector of FIG. 1 linking a first and second fall arresting devices to a safety harness.

As described herein, connector 10 may be used to attach one or more fall arresting devices to a safety harness. FIGS. 8 and 9 illustrate an example fall protection system 80 that includes connector 10 to a safety harness 82 and fall arresting devices 84A and 84B. FIG. 8 illustrates an intermediate assembly stage where only fall arresting device 84A has been attached to connector 84A and FIG. 9 illustrates fall protection system 80 in a fully assembled stage with both fall arresting devices 84A and 84B attached to connector 10.

As shown in FIGS. 8 and 9, connector 10 may be attached to a strong point 86 of safety harness 86. In some examples, the strong point of a safety harness may be comprised of one of more straps or pieces of webbing that form part of the harness. In the illustration of FIG. 8, strong point 86 of safety harness 82 includes two pieces of webbing crossing over one another to provide a point for anchoring safety harness 82 to other fall protection equipment. In some examples, safety harness 82 may be constructed such that strong point 86 lies in the middle of the upper back of a user when the user wears safety harness 82. Such positioning of strong point 86 may provide sufficient comfort to the user during the arrest of a fall as well as positioning connector 10 and the attached fall arresting devices 84A and 84B away from the work area of the user.

Strong point 86 may be connected to second side 16 of connector 10 by second pin 20. For example, second-side opening 32 may be configured to receive strong point 86 of a safety harness 82 when second pin 20 is in an open configuration (e.g., the configuration of FIG. 2). Second pin 20 may then be advanced underneath strong point 86 until sixth receiving portion 30B receives second pin 20. Once in the closed configuration (e.g., the configuration of FIG. 1), engaging members 42 of third and fourth locking mechanisms 34C and 34D will engage with second and first locking notches 72A and 72B respectively of second pin 20 to lock the pin in the fully closed configuration. Second pin 20 thereby captures strong point 86 within second opening 32 preventing connector 10 from being disconnected from safety harness 82.

To remove strong point 86 from connector 10, heads 48 of both third and fourth locking mechanisms 34C and 34D may be pressed to disengage engaging members 42 of the locking mechanisms from locking notches 72A and 72B. Next, second pin 20 may be slidably withdrawn to return second pin 20 to the open configuration (e.g., the configuration of FIG. 2) to allow strong point 86 to be removed from second opening 32. In some examples, second pin 20 may include a head 90 at one end that may be grasped by the user to assist with slidably withdrawing second pin 20.

In some examples, by designing connector 10 to be attached to strong point 86 via second pin 20, connector 10 may provide several advantages compared to traditional connectors. For example, the cylindrical shape of shaft 70 of second pin 20 allows for the smooth advancement of second pin 20 underneath strong point 86. This may in turn limit the chance the straps forming strong point 86 from twisting of otherwise pinching within connector 10. Further, the design of second side 16 may require less effort by the user in order to attach connector 10 to safety harness 82 and ensure that the straps are properly positioned (e.g., dressed) against second pin 20. In comparison, traditional connectors connect to strong point 86 via the base portion itself and utilize a single pin or gate to attach a fall arresting devices to the base portion. Because traditional base portions are typically bulky, the user must pull the straps of strong point 86 to create enough slack to form an opening large enough to allow the base portion to slide underneath strong point 86. As the straps of safety harness 82 may be relatively stiff to ensure strong point 86 can withstand the forces associated with a fall, creating the slack at strong point 86 may take significant effort by the user. Additionally, due to the shape and bulk of the traditional base portions, the base may be more prone to catch on or twist the straps as a user attaches the base portion to safety harness 82. Therefore, by attaching connector 10 to strong point 86 via second pin 20 as described herein, connector 10 may provide an easy and convenient mechanism for being attached to safety harness 82.

Fall arresting devices 84A and 84B may be connected to first second side 14 of connector 10 with first pin 18. Fall arresting devices 84A and 84B may include any suitable device designed to connect to a support structure and arrest the fall of a user. Example fall arresting devices may include an SRL such as a 3M™ DBI-SALA® SRL manufactured by 3M Fall Protection Business, a vertical lifeline such as a 3M™ DBI-SALA® Mobile Rope Grab manufactured by 3M Fall Protection Business, safety lanyards, or the like.

Plurality of first-side openings 28A-28C each may be configured to receive a connection point 88A and 88B of a fall arresting device 84A or 84B. Connection points 88A and 88B may include, but are not limited to, a closed connector such as an eyebolt, a gated connector such as a quick-link or carabiner. Connection points 88A and 88B may include an aperture sufficiently sized to receive shaft 60 of first pin 18 such that when first pin 18 is in a fully closed and locked configuration (e.g., the configurations of FIGS. 1 and 9), first pin 18 captures connection points 88A and 88B of fall arresting devices 84A and 84B thereby preventing connector 10 from being disconnected from fall arresting devices 84A and 84B.

In some examples, by including first locking mechanism 34A on an interior receiving portion such as third receiving portion 22C, connector 10 may provide a partially closed, and locked configuration, (e.g., the configuration of FIG. 8) thereby allowing fall arresting devices 84A and 84B to be attached to connector 10 independently of one another. For example, when in a fully open configuration (e.g., the configuration of FIG. 2), connection point 88A of first fall arresting device 84A may be received within first-side opening 28A defined by first and third receiving portions 22A and 22C. First pin 18 may then be slidably advanced through first receiving channel 24A, the aperture of connection point 88A, and third receiving channel 24C until first locking notch 36A of shaft 60 engages with first locking mechanism 34A to connect and lock fall arresting device 84A to connector 10.

Connection point 88B of a second fall arresting device 84A may then be received by one of the remaining plurality first-side openings, such as first-side opening 28C defined by second and fourth receiving portions 22B and 22D. The user may then depress head 48 of first locking mechanism 34A to disengage engaging member 42 of the locking mechanism and allow first pin 18 to be slidably advanced through the aperture of connection portion 88B towards second receiving channel 24B. Once first pin 18 advances to the fully closed configuration (e.g., the configuration of FIG. 1), first locking mechanism 34A will engage with second locking notch 36B to capture and retain both connection points 88A and 88B of fall arresting devices 84A and 84B with in first and third first-side opening 28A and 28C. In examples, where first side 14 also includes second locking mechanism 34B, once first pin 18 enters the fully closed configuration, second locking mechanism 34B will engage with first locking notch 36A.

To remove one or both of fall arresting devices 84A and 84B from connector 10, heads 48 of both first and second locking mechanisms 34A and 34B may be pressed to disengage the engaging members 42 of the locking mechanisms. Next, first pin 18 may be slidably withdrawn to return first side 14 of connector 10 to the fully open configuration (e.g., the configuration of FIG. 2) to allow connection points 88A and 88B to be removed from first-side openings 28A and 28C. In some examples, first pin 18 may include a head 92 at one end that may be grasped by the user to assist with slidably withdrawing first pin 18.

In some examples, by including first and second locking mechanisms 34A and 34B within interior receiving portions 22C and 22D as opposed to the exterior first and second receiving portions 22A and 22B, first and second fall arresting devices 84A and 84B may exhibit a greater range of mobility within connector 10. For example, by including first and second locking mechanisms 34A and 34B within interior receiving portions 22C and 22D, first and second receiving portions 22A and 22B forming the respective first and second ends 26A and 26B may remain relatively non-obstructed or less bulky compared to interior receiving portions 22C and 22D. The apertures of connection points 88A and 88B may be sized such that while connected to connector 10 (e.g., the configuration of FIG. 9), one or both of connection points 88A and 88B may be permitted to pivot around first and second ends 26A and 26B respectively. For example, connection point 88B of second fall arresting device 84B may be able to pivot clockwise within FIG. 9 such that connection point slides over second receiving portion 22B to align horizontally within FIG. 9 (e.g., parallel to the longitudinal axis of first pin 18) while still remaining captured within first-side opening 28C.

In some examples, the ability of connection points 88A and 88B to pivot around first and second ends 26A and 26B of first side 14 may allow for a greater degree of user mobility and safer operation of fall protection system 80 during use. For example, fall arresting devices 84A and 84B are typically connected such that the devices align vertically relative to the user (e.g., as shown in FIG. 9). If the user traverses laterally away from the support structure to which they are anchored, fall arresting devices 84A and 84B may be pulled in a horizontal direction relative to the user (e.g., a pulled parallel relative to the central axis of first pin 18). Absent the ability of one or more of fall arresting devices 84A and 84B to freely pivot around first or second ends 26A and 26B, fall arresting devices 84A and 84B may bind within plurality of first-side openings 28A-28C. Such binding may lead to increased drag when extending of retracting the tether (e.g., lifeline) linking fall arresting devices 84A and 84B to the support structure impeding the ability of the user to freely move relative to the support structure. Additionally or alternatively, in the event of a fall, such binding cause additional shock-loading of fall protection system 80 causing increased stress forces on one or more of the components to arrest the user fall.

Figure 10:
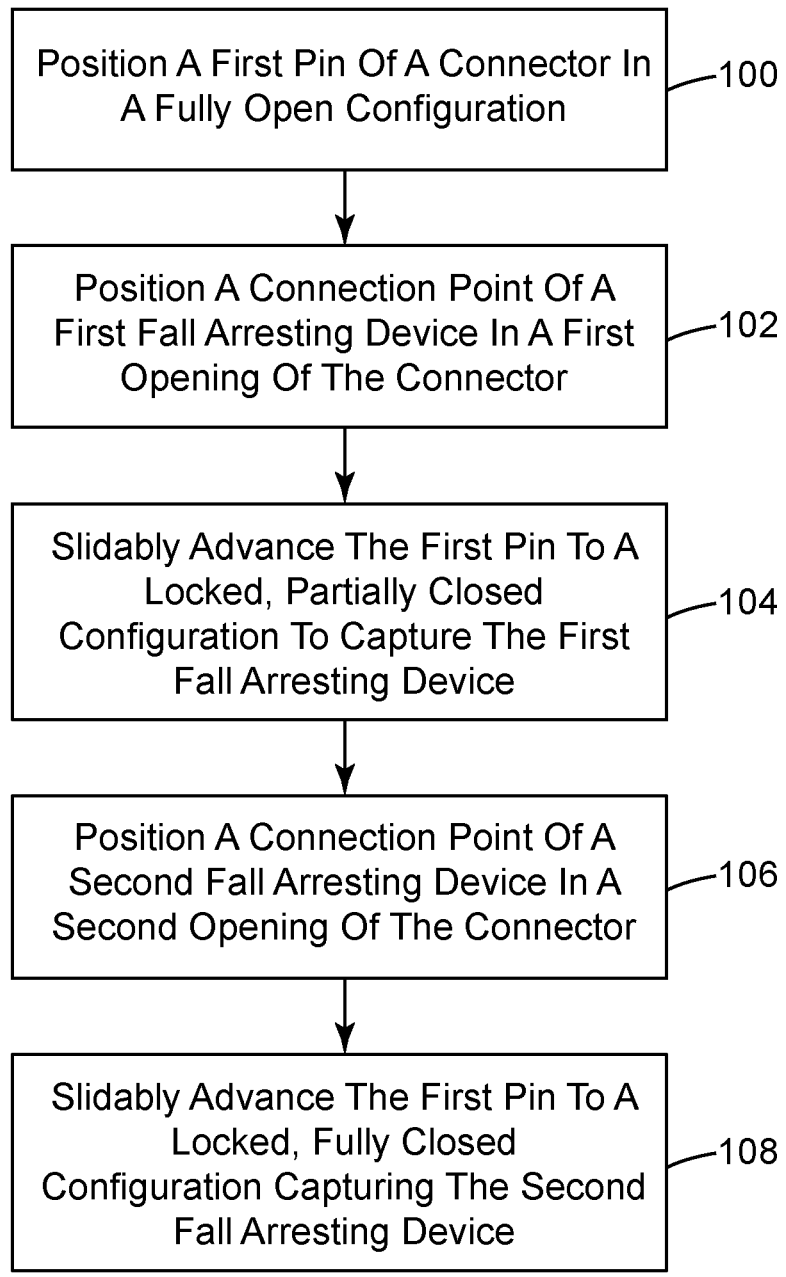
FIGS. 10 and 11 are flow diagrams illustrating example techniques for attaching more than one fall arresting devices to a safety harness using the example connector of FIG. 1.
Figure 11:
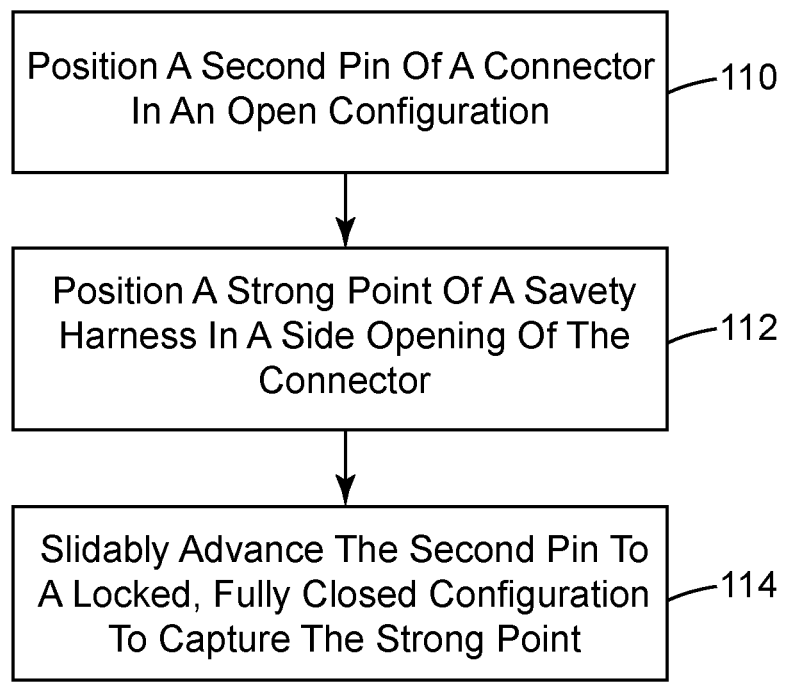

FIGS. 10 and 11 are flow diagrams illustrating example techniques for attaching more than one fall arresting devices 84A and 84B to safety harness 82 using connector 10. The technique of FIG. 10 corresponds to attaching fall arresting devices 84A and 84B to connector 10 and includes positioning first pin 18 of the connector 10 to a fully open configuration (e.g, the configuration of FIG. 2) (100), positioning connection point 84A of a first fall arresting device 84A within first-side opening 28A (102), slidably advancing first pin 18 to a locked, partially closed configuration (e.g., the configurations of FIGS. 3 and 8) to capture connection point 84A of a first fall arresting device 84A within first-side opening 28A (104), positioning connection point 84B of second fall arresting device 84B within a subsequent first-side opening 28C of connector 10 (106), and slidably advancing first pin 18 to a locked, fully closed configuration (e.g., the configurations of FIGS. 1 and 9) to capture connection point 88B of second fall arresting device 84B within first-side opening 28C (108).

As described above, connector 10 may include a base 12 that defines first side 14 that includes plurality of first-side receiving portions 22A-22D having at least a first receiving portion 22A defining first receiving channel 24A and first end 26A of first side 14, a second receiving portion 22B defining second receiving channel 24B and second end 26B of first side 14, and a third receiving portion 22C defining third receiving channel 24C and positioned between first and second receiving portions 22A and 22B.

In a fully opened configuration (100), first pin 18 may be received only within first receiving channel 24A such that first-side opening 28A defined by first and third receiving portions 22A and 22C is open and accessible. In some such examples, alignment pin 62 within first receiving portion 22A may engage with slot 64 to prevent first pin 18 from being removed from base 12.

Once in the fully open configuration (e.g., the configuration of FIG. 2), connection point 88A of first fall arresting device 84A may be introduced into first-side opening 28A defined by first and third receiving portions 22A and 22C (102), first pin 18 may be slidably advanced to a locked, partially closed configuration (e.g., the configurations of FIGS. 3 and 8) to capture connection point 88A of a first fall arresting device 84A within first-side opening 28A (104). For example, first pin 18 may be advanced through an aperture of connection point 88A and into third receiving channel 22C to capture connection point 88A and prevent the detachment of fall arresting device 84A from connector 10. In examples where third receiving portion 22C includes first locking mechanism 34A, head 48 of first locking mechanism 34A may be depressed and first pin 18 may be slidably advanced until first locking notch 36A of first pin aligns with first locking mechanism 34A. Head 48 of first locking mechanism 34A may then be released so that first locking notch 36A engages with engaging member 42 to effectively lock first pin 18 in a partially closed configuration (e.g., the configuration of FIG. 8) preventing first pin 18 from being withdrawn from third receiving channel 24C (e.g., towards the fully open configuration). Additionally or alternatively, first pin 18 may include one or more ramp portions 63A and 63B, for example, a first ramp portions 63A extending from a leading end of shaft 60 to first locking notch 32A. Ramp portion 63A may depress engaging member 42 of first locking mechanism 34A when an advancing force is applied to allow first pin 18 to be slidably advanced towards the fully closed configuration without needing the user to manually depress head 48 of first locking mechanism 34A to reach the locked, partially closed configuration.

In some examples, by having first pin 18 in a locked, partially closed configuration the user may conveniently attach fall arresting devices 84A and 84B independent of one another without needing to handle both devices simultaneously to attach them to connector 10.

Once first fall arresting device 84A has been attached to connector 10 as described above, the user may then attach a second fall arresting device 84B to connector 10 by introducing connection point 88B of second fall arresting device 84B within another one of first-side openings 28B or 28C (106) and first pin 18 may then be slidably advanced to a locked, fully closed configuration (e.g., the configurations of FIGS. 1 and 9) to capture connection point 88B of second fall arresting device 84B within another opening 28B or 28C of plurality of first-side openings 28A-28C (108). For example, connection point 88B of second fall arresting device 84B may be introduced into first-side opening 28C defined by second and fourth receiving portions 22B and 22D. First locking mechanism 34A may then be disengaged from first locking notch 36A by depressing head 48. In examples where first pin 18 includes second ramp 63B between first and second locking notches 36A and 36B, second ramp 63B may automatically disengage first locking mechanism when an advancing force is applied without needing to manually depress head 48. First pin 18 may then be slidably advanced through fourth receiving channel 24D (e.g., by also depressing head 48 of second locking mechanism 34B when present), the aperture of connection point 88B, and second receiving channel 24B. Once fully inserted, first locking mechanism 34A will engage with second locking notch 36B to lock first pin 18 in place, thereby capturing both first and second fall arresting devices 84A and 84B and preventing them from being disconnected from connector 10. In examples where first side 14 also includes second locking mechanism 34B for redundant protection, second locking mechanism may engage with first locking notch 36A when first pin 18 has been fully inserted within base 12.

While connection point 88B of second fall arresting device 84B may be introduced within either first-side opening 28B or 28C, in some examples it may be preferable to retain second fall arresting device 84B within first-side opening 28C in order to balance the assembly of connector 10 and prevent the connector from twisting or binding during use. Additionally or alternatively, where connector 10 includes both first and second locking mechanisms 34A and 34B within interior receiving portions 22C and 22D, having second fall arresting device 84B within first-side opening 28C may permit connection point 88B to pivot around second end 26B (e.g., second receiving portion 22B) as described above.

In order to remove first and second fall arresting devices 84A and 84B from connector 10, heads 48 of first and second locking mechanisms 34A and 34B may be depressed and first pin 18 slidably withdrawn to free connection points 88A and 88B from first-side openings 28A and 28C.

The technique of FIG. 11 corresponds to attaching connector 10 to safety harness 82 and include positioning second pin 20 of connector 10 to a fully open configuration (e.g., the configuration of FIG. 2) (110), positioning strong point 86 of safety harness 82 within second-side opening 32 (112), and slidably advancing second pin 20 to a locked, fully closed configuration (e.g., the configurations of FIGS. 1 and 8) to capture strong point 86 within second-side opening 32 (114).

As described above, connector 10 may include a base 12 that defines second side 14 that includes fifth and sixth receiving portions 30A and 30B each defining a receiving channel 68A and 68B. Fifth and sixth receiving portions 30A and 30B also define a second-side opening 32 between the receiving portions that is spanned by second pin 20 when second pin 20 is in a fully closed configuration (e.g., the configuration of FIG. 1).

In a fully opened configuration (110), second pin 20 may be received only within fifth receiving channel 30A such that second-side opening 32 remains open and accessible. In some such examples, alignment pin 62 within fifth receiving portion 30A may engage with slot 78 to prevent second pin 20 from being removed from base 12.

Once in the fully open configuration (e.g., the configuration of FIG. 2), strong point 86 of safety harness 82 may be introduced into second-side opening 32. Second pin 20 may then be slidably advanced underneath strong point 86 to a locked, fully closed configuration (e.g., the configurations of FIGS. 1 and 8) to capture strong point 86 within second-side opening 32 (114). As described above, slidably advancing second pin 20 underneath strong point 86 as opposed to base 12 may provide several advantages including making the assembly of fall protection system 80 more convenient and easier to check for accuracy of assembly.

Once in the fully locked configuration, third and fourth locking mechanisms 34C and 34D may engage with first and second locking notches 72A and 72B to redundantly retain second pin 20 within base 12.

In order to release safety harness 82 from connector 10, heads 48 of third and fourth locking mechanisms 34C and 34D may be depressed and second pin 20 slidably withdrawn from sixth receiving channel 68B to free strong point 86 from second-side opening 32.

Various examples have been described. These and other examples are within the scope of the following claims.

What is claimed is:

1. A connector for coupling fall arresting devices to a safety harness, the connector comprising:
   a pin having a locking notch; and
   a base defining a first side and a central longitudinal axis, the first side of the base comprising: a plurality of first-side receiving portions extending outwardly from the base and spaced apart from each other to define a plurality of first-side openings for receiving one or more connection points of respective ones of the fall arresting devices, the plurality of first-side receiving portions comprising:
   a first receiving portion defining a first receiving channel, the first receiving portion defining a first end of the first side;
   a second receiving portion defining a second receiving channel, the second receiving portion defining a second end of the first side; and
   a third receiving portion defining a third receiving channel, the third receiving portion positioned between the first and second receiving portions, the pin slidably connected to the plurality of first-side receiving portions and spanning the plurality of first-side openings and extending through the first, second, and third receiving channels when the pin is in a fully closed configuration; and
   a locking mechanism connected to the third receiving portion, the locking mechanism configured to releasably engage with the locking notch of the pin when the pin is in the fully closed configuration to prevent the pin from being slidably withdrawn through the third receiving channel,
   wherein the locking notch comprises a first locking notch defined along a shaft of the pin, the shaft of the pin further defining a second locking notch separate and distinct from the first locking notch, the locking mechanism configured to releasably engage with the second locking notch of the pin when the pin is in a partially closed configuration to prevent the pin from being slidably withdrawn through the third receiving channel so that the pin spans a first opening of the plurality of first-side openings defined by the first and third receiving portions but not a second opening of the plurality of first-side openings defined by the second and third receiving portions; and
   wherein the first opening and second opening are adjacent to the third receiving portion and do not extend beyond the central longitudinal axis of the base.

2. The connector of claim 1, wherein the locking mechanism comprises a first locking mechanism, the connector further comprising a second locking mechanism connected to one of the plurality of first-side receiving portions.

3. The connector of claim 2, wherein the plurality of first-side receiving portions comprises a fourth receiving portion defining a fourth receiving channel, the fourth receiving portion positioned between the third and second receiving portions, the fourth receiving portion comprising the second locking mechanism.

4. The connector of claim 1, wherein the first receiving portion defines a lateral channel extending substantially perpendicular to the first receiving channel, the pin comprising a shaft that defines a longitudinal slot extending along a portion of the shaft, the connector further comprising an alignment pin received within the lateral channel and the longitudinal slot, the alignment pin configured to prevent a rotation of the pin within the first receiving channel.

5. The connector of claim 4, wherein the alignment pin prevents the pin from being removed from the base.

6. The connector of claim 1, wherein the pin comprises a first pin, the locking notch comprises a first locking notch, and the locking mechanism comprises a first locking mechanism, the base defining a second side opposite the first side, wherein the connector further comprises a second pin comprising a shaft defining a second locking notch, and wherein the second side of the base comprises:
   a fourth receiving portion defining a fourth receiving channel;
   a fifth receiving portion defining a fifth receiving channel, the fourth and fifth receiving portions separated from each other to define a second-side opening, the second pin slidably connected to the fourth and fifth receiving portions, the second pin spanning the second-side opening and extending through the fourth and fifth receiving channels when the second pin is in a fully closed configuration; and
   a second locking mechanism connected to the fourth receiving portion, the second locking mechanism configured to releasably engage with the second locking notch of the second pin when the second pin is in the fully closed configuration to prevent the second pin from being slidably withdrawn through the fourth receiving channel.

7. The connector of claim 6, further comprising a third locking mechanism connected to the fifth receiving portion, the shaft of the second pin defining a third locking notch separate and distinct from the second locking notch, the third locking mechanism configured to releasably engage with the third locking notch of the second pin when the second pin is in the fully closed configuration to prevent the second pin from being slidably withdrawn through the fifth receiving channel.

8. The connector of claim 6, wherein the fourth receiving portion defines a lateral channel extending substantially perpendicular to the fourth receiving channel, the shaft of the second pin defines a longitudinal slot extending along a portion of the shaft, the connector further comprising an alignment pin received within the lateral channel and the longitudinal slot, the alignment pin configured to prevent a rotation of the second pin within the fourth receiving channel.

9. The connector of claim 8, wherein the alignment pin prevents the second pin from being removed from the base.

10. A system comprising:
a safety harness comprising a strong point for connecting the safety harness to additional safety equipment; at least one fall arresting device, each fall arresting device comprising a connection point; and a connector comprising:
a pin having a locking notch; and
a base defining a first side and a central longitudinal axis, the first side of the base comprising: a plurality of first-side receiving portions extending outwardly from the base and spaced apart from each other to define a plurality of first-side openings for receiving one or more connection points of respective ones of the fall arresting devices, the plurality of first-side receiving portions comprising:
a first receiving portion defining a first receiving channel, the first receiving portion defining a first end of the first side;
a second receiving portion defining a second receiving channel, the second receiving portion defining a second end of the first side; and
a third receiving portion defining a third receiving channel, the third receiving portion positioned between the first and second receiving portions, the pin slidably connected to the plurality of first-side receiving portions and spanning the plurality of first-side openings and extending through the first, second, and third receiving channels when the pin is in a fully closed configuration; and
a locking mechanism connected to the third receiving portion, the locking mechanism configured to releasably engage with the locking notch of the pin when the pin is in the fully closed configuration to prevent the pin from being slidably withdrawn through the third receiving channel,
the connection point of the at least one fall arresting device received by one of the plurality of first-side openings on the first side of the connector, wherein the pin, when in the fully closed configuration, connects the connection point to the connector to prevent the at least one fall arresting device from being disconnected from the connector,
the strong point of the of the safety harness releasably secured to a second side of the connector,
wherein the locking notch comprises a first locking notch defined along a shaft of the pin, the shaft of the pin further defining a second locking notch separate and distinct from the first locking notch, the locking mechanism configured to releasably engage with the second locking notch of the pin when the pin is in a partially closed configuration to prevent the pin from being slidably withdrawn through the third receiving channel so that the pin spans a first opening of the plurality of first-side openings defined by the first and third receiving portions but not a second opening of the plurality of first-side openings defined by the second and third receiving portions; and
wherein the first opening and second opening are adjacent to the third receiving portion and do not extend beyond the central longitudinal axis of the base.

11. The system of claim 10, wherein the least one fall arresting device comprises a first fall arresting device and a second fall arresting device, the connection point of the first fall arresting device received by a first opening of the plurality of first-side openings that is defined by the first and third receiving portions, the connection point of the second fall arresting device received by a second opening of the plurality of first-side openings.

12. The system of claim 10, wherein the plurality of first-side receiving portions comprises a fourth receiving portion defining a fourth receiving channel, the fourth receiving portion positioned between the third and second receiving portions, the second opening of the plurality of first-side openings defined by the second and fourth receiving portions.

13. The system of claim 10, wherein the locking mechanism comprises a first locking mechanism, the connector further comprising a second locking mechanism connected to one of the plurality of first-side receiving portions.

14. The system of claim 10, wherein the first receiving portion defines a lateral channel extending substantially perpendicular to the first receiving channel, the pin comprising a shaft that defines a longitudinal slot extending along a portion of the shaft, the connector further comprising an alignment pin received within the lateral channel and the longitudinal slot, the alignment pin configured to prevent a rotation of the pin within the first receiving channel.

15. The system of claim 10, wherein the pin comprises a first pin, the locking notch comprises a first locking notch, and the locking mechanism comprises a first locking mechanism, the connector further comprising a second pin comprising a shaft defining a second locking notch, wherein the second side of the base comprises:
a fourth receiving portion defining a fourth receiving channel;
a fifth receiving portion defining a fifth receiving channel, the fourth and fifth receiving portions separated from each other to define a second-side opening, the second pin slidably connected to the fourth and fifth receiving portions, the second pin spanning the second-side opening and extending through the fourth and fifth receiving channels when the second pin is in a fully closed configuration; and
a second locking mechanism connected to the fourth receiving portion, the second locking mechanism configured to releasably engage with the second locking notch of the second pin when the second pin is in the fully closed configuration to prevent the second pin from being slidably withdrawn through the fourth receiving channel, the strong point of the of the safety harness received by the second-side opening on the second side of the connector, the second pin, when in the closed configuration, connecting the strong point to the connector to prevent the safety harness from being disconnected from the connector.

16. A method comprising:

positioning a pin of a connector in a fully open configuration, the connector comprising: a pin having a locking notch; and a base defining a first side and a central longitudinal axis, the first side of the base comprising:

a plurality of first-side receiving portions extending outwardly from the base and spaced apart from each other to define a plurality of first-side openings for receiving one or more connection points of respective ones of fall arresting devices, the plurality of first-side receiving portions comprising:

a first receiving portion defining a first receiving channel, the first receiving portion defining a first end of the first side;

a second receiving portion defining a second receiving channel, the second receiving portion defining a second end of the first side; and a third receiving portion defining a third receiving channel, the third receiving portion positioned between the first and second receiving portions, the pin slidably connected to the plurality of first-side receiving portions and spanning the plurality of first-side openings and extending through the first, second, and third receiving channels when the pin is in a fully closed configuration; and a locking mechanism connected to the third receiving portion, the locking mechanism configured to releasably engage with the locking notch of the pin when the pin is in the fully closed configuration to prevent the pin from being slidably withdrawn through the third receiving channel;

wherein, when the pin of the connector is in the fully open configuration, the pin is received by only the first receiving channel and does not span the plurality of first-side openings;

positioning a first connection point of a first fall arresting device within a first opening of the plurality of first-side openings, the first opening defined by a separation distance between the first receiving portion and the third receiving portion;

slidably advancing the pin to a partially closed configuration wherein the pin is received by the first and third receiving channels and spans a first opening of the plurality of first-side openings defined by the first and third receiving portions but not a second opening of the plurality of first-side openings defined by the second and third receiving portions, the pin captures the first connection point of the first fall arresting device to prevent the first fall arresting device from being disconnected from the connector;

positioning a second connection point of a second fall arresting device within the second opening of the plurality of first-side openings; and slidably advancing the pin to the fully closed configuration where the pin is received by the first, second, and third receiving channels and spans the plurality of first-side openings, the pin captures the second connection point of the second fall arresting device to prevent the second fall arresting device from being disconnected from the connector, wherein the locking notch comprises a first locking notch defined along a shaft of the pin, the shaft of the pin further defining a second locking notch separate and distinct from the first locking notch, wherein when in the partially closed configuration, the locking mechanism releasably engages the second locking notch of the pin to prevent the pin from being slidably advanced or withdrawn through the third receiving channel; and wherein the first opening and second opening are adjacent to the third receiving portion and do not extend beyond the central longitudinal axis of the base.

17. The method of claim 16, wherein the locking mechanism comprises a first locking mechanism, the connector further comprising a second locking mechanism connected to one of the plurality of first-side receiving portions, the method further comprises disengaging the first and second locking mechanisms and slidably withdrawing the pin from the third receiving channel to release the first and second fall arresting devices from the connector.

\* \* \* \* \*